United States Patent [19]
Farrenkopf

[11] Patent Number: 6,100,677
[45] Date of Patent: Aug. 8, 2000

[54] SWITCHING CONTROLLER CHIP WITH INTERNAL BUT NOT EXTERNAL SOFT START CIRCUITRY AND DC TO DC CONVERTER INCLUDING SUCH A CONTROLLER CHIP

[75] Inventor: Douglas Robert Farrenkopf, Campbell, Calif.

[73] Assignee: National Semiconductor Corporation, Santa Clara, Calif.

[21] Appl. No.: 09/420,063

[22] Filed: Oct. 18, 1999

[51] Int. Cl.$^7$ ....................................................... G05F 1/40
[52] U.S. Cl. ........................................... 323/285; 323/282
[58] Field of Search .................................... 323/273, 274, 323/282, 284, 285; 363/50, 53, 56

[56] References Cited

U.S. PATENT DOCUMENTS

| | | | |
|---|---|---|---|
| 3,769,568 | 10/1973 | Hamilton et al. | 321/2 |
| 4,180,852 | 12/1979 | Koizumi et al. | 363/49 |
| 5,248,904 | 9/1993 | Miyazaki et al. | 307/271 |
| 5,675,485 | 10/1997 | Seong | 363/97 |

*Primary Examiner*—Matthew Nguyen
*Attorney, Agent, or Firm*—Limbach & Limbach L.L.P.

[57] ABSTRACT

A DC-to-DC converter which includes a switching controller or regulator (implemented as an integrated circuit) and circuitry external to the controller or regulator chip, where the controller or regulator chip includes soft start circuitry but requires no component external thereto (other than the external circuitry present in DC-to-DC converters having no soft start capability) in order to accomplish a soft start. The invention is especially useful where it is impractical or undesirable to implement the controller or regulator chip with a pin dedicated for connection to an external soft start capacitor or other component or circuit for performing a soft start operation. Other aspects of the invention are a controller or regulator chip for use in such a converter, and a method for performing DC-to-DC conversion using such a switching controller or regulator chip and external circuitry coupled to the controller or regulator chip to generate an output potential which increases to a regulated value during a soft start period and remains at the regulated value during steady state operation. Preferably, the controller or regulator chip includes an on-board capacitor, charging circuitry for charging the capacitor during a soft start period, an over-voltage comparator which compares the voltage across the capacitor with a feedback potential (proportional to the output potential of a DC-to-DC converter with which the controller or regulator chip is used), and an OR gate having a first input coupled to receive the output of the comparator and a second input coupled to receive a reset signal which (during steady state operation of the controller or regulator chip) triggers the switching off of the converter's power transistor.

44 Claims, 10 Drawing Sheets

$$\text{slope} = (I_{soft})\left(\frac{W_1 L_2}{W_2 L_1}\right)\left(\frac{P}{T}\right)\left(\frac{I}{C_1}\right)$$

SWITCHING CONTROLLER CHIP WITH INTERNAL BUT NOT EXTERNAL SOFT START CIRCUITRY AND DC TO DC CONVERTER INCLUDING SUCH A CONTROLLER CHIP

BACKGROUND OF THE INVENTION

1. Field of the Invention

The present invention relates to switching power supply circuitry. Specifically, the invention relates to DC-to-DC converters that include a switching controller or regulator (implemented as an integrated circuit), and circuitry (typically including a current sense resistor) external to the controller or regulator chip, with the controller or regulator chip including soft start circuitry but requiring no component external thereto (other than the conventional components present in DC-to-DC converters having no soft start capability) in order to accomplish a soft start.

2. Description of the Related Art

FIG. 1 is a conventional DC-to-DC converter which includes current mode switching controller 1 which is implemented as an integrated circuit, and boost converter circuitry external to controller chip 1. The boost converter circuitry comprises NMOS transistor N1 (which functions as a power switch), inductor L, current sense resistor $R_s$, Schottky diode D, capacitor $C_{out}$, feedback resistor divider $R_{F1}$ and $R_{F2}$, compensation resistor $R_c$, and compensation capacitor $C_c$, connected as shown. The FIG. 1 converter produces a regulated DC output voltage $V_{out}$ across load $R_o$, in response to input DC voltage $V_{in}$.

Controller chip 1 includes oscillator 2 (having a first output and a second output), comparator 8, driver 6 which produces an PATENT output potential $V_{DR}$ at pad 12 (to which the gate of switch N1 is coupled), latch 4 (having "set" terminal coupled to oscillator 2, "reset" terminal coupled to the output of comparator 8, and an output coupled to the input of driver 6), error amplifier 1 (having a non-inverting input maintained at bandgap reference potential $V_{ref}$), and circuit 9 (having a first input coupled to the second output of oscillator 2, a second input coupled to pad 13, and an output coupled to the inverting input of comparator 8).

Pad 13 is at potential $V_c$, which is determined by the output of error amplifier 10 (in turn determined by the difference between the instantaneous potential at Node A and the reference potential $V_{ref}$) and the values of external resistor $R_c$ and capacitor $C_c$. Reference potential $V_{ref}$ is set (in a well known manner) by circuitry within chip 1, and is normally not varied during use of the circuit. In order to set the regulated level of the output voltage $V_{out}$, resistors $R_{F1}$ and $R_{F2}$ with the appropriate resistance ratio $R_{F1}/R_{F2}$ are employed.

Oscillator 2 asserts a clock pulse train (having fixed frequency and waveform as indicated) at its first output, and each positive-going leading pulse edge of this pulse train sets latch 4. Each time latch 4 is set, the potential $V_{DR}$ asserted by driver 6 to the gate of transistor N1 causes transistor N1 to turn on, which in turn causes current $I_L$ from the source of N1 to increase in ramped fashion (more specifically, the current $I_L$ increases as a ramp when transistor N1 is on, and is zero when transistor N1 is off. The current through diode D is zero when N1 is on, it increases sharply when N1 switches from on to off, then falls as a ramp while N1 is off, and then decreases sharply to zero when N1 switches from off to on). Although transistor N1 turns on at times in phase with th periodic clock pulse train, it turns off at times (which depend on the relation between reference potential $R_{ref}$ and the instantaneous potential at Node A) that have phase that is independent relative to that of the pulses of the periodic clock pulse train.

Oscillator 2 asserts ramped voltage $V_{osc}$ (which periodically increases at a fixed ramp rate and then decreases with a waveform as indicated) at its second output. Circuit 9 asserts the potential $V_c-V_{osc}$ to the inverting input of comparator 8. Assertion of the potential $V_c-V_{osc}$ (rather than $V_c$) to comparator 8 is necessary for stability.

The non-inverting input of comparator 8 is at the feedback potential $V_s=I_L R_s$, which increases in ramped fashion in response to each "set" of latch 4 by oscillator 2. When $V_s=V_c-V_{osc}$ (after latch 4 has been set), the output of comparator 8 resets latch 4, which in turn causes the potential $V_{DR}$ asserted by driver 6 to the gate of transistor N1 to turn off transistor N1. Thus, by he described use of both signals output from oscillator 2 and feedback asserted to error amplifier 10 from Node A, controller chip 1 switches transistor N1 on and off with timing that regulates the output potential $V_{out}$ of the FIG. 1 circuit.

However, the conventional circuit of FIG. 1 has an important disadvantage which exists because during "start up" of the FIG. 1 circuit, $V_{out}$ must rise from its initial value of 0 V (zero volts above ground) to its regulated value. Because $V_{out}$ typically is initially much lower than its regulated value, the duty cycle of switch N1 during start up can be very high. This situation can cause the inductor current to rise above its equilibrium value, and because the current in inductor L cannot change instantaneously, it can remain above its equilibrium value for a short time. This can cause the output voltage to rise above its regulated value. This excessive rise is commonly referred to as overshoot. Overshoot is a well understood phenomenon and most conventional switching controllers (including most conventional current mode switching controllers) employ some sort of soft start circuitry to reduce or eliminate overshoot.

Other conventional DC-to-DC converters which include a current mode switching controller implemented as an integrated circuit (as does the FIG. 1 circuit) also include circuitry (e.g., buck converter circuitry) other than boost converter circuitry that is external to the controller chip. For example, the conventional DC-to-DC converter of FIG. 2 includes controller chip 101, and buck controller circuitry external to chip 101. The buck controller circuitry of FIG. 2 differs from the boost converter circuitry of FIG. 1 in that the source of NMOS transistor N1 is coupled through inductor L1 to the output node (whereas in FIG. 1 the drain of transistor N1 is coupled through diode D to the output node, and inductor L is coupled between the input potential $V_{in}$ and the source of N1), Schottky diode D1 is connected between ground and the source of N1 (replacing diode D of FIG. 1), sense resistor $R_{sense}$ is connected between the input potential $V_{in}$ and the drain of N1 (rather than between ground and the source of N1 as in FIG. 1), and boost capacitor $C_B$ is coupled between chip 101 and the source of transistor N1.

Controller chip 101 includes elements 2, 4, 6, 8, 9 and 10 of FIG. 1 (which are connected as shown in FIG. 1, but are not shown in FIG. 2 for simplicity). Chip 101 differs from chip 1 of FIG. 1 only in minor respects apparent to those of ordinary skill in the art (including in that it has a pin coupled to boost capacitor $C_B$). Chip 101 of FIG. 2 functions in essentially the same manner as does chip 1 of FIG. 1, including by turning on transistor N1 by setting latch 4 (in response to pulses from a clock pulse train produced by oscillator 2) and turning off transistor N1 by resetting latch 4 in response to a comparison of $V_c-V_{osc}$ (where $V_{osc}$ is a ramped voltage produced by oscillator 2 and $V_c$ is the potential at the pin labeled "FB") with a feedback potential indicative of the potential $V_s$ at Node E (between resistor $R_{sense}$ and the drain of N1). After latch 4 within chip 101 has been set, the latch 4 resets (causing driver 6 within chip 101 to assert a potential $V_{DR}$ to the gate of transistor N1 which turns off transistor N1) when $V_s=V_c-V_{osc}$.

The FIG. 2 converter is subject to the above-noted disadvantage of the FIG. 1 circuit. Specifically, because $V_{out}$ is typically initially much lower than its regulated value, the duty cycle of switch N1 during start up is typically initially very high FIG. 3 is graph of the potential difference between the gate of transistor N1 (which is at potential $V_{DR}$) and the source of transistor N1 (which is at potential $V_{SW}$) during start up of the FIG. 2 converter. It is apparent from FIG. 3 that transistor N1 initially has a high duty cycle (N1 is initially switched on for time intervals much longer than the intervals in which it is off), and that the duty cycle of transistor N1 decreases as the FIG. 2 converter settles into its equilibrium state.

As shown in FIG. 4, this situation typically causes the current $i_L$ through inductor L1 to rise (e.g., at time T1) above its equilibrium value before it settles (e.g., at later time T2) into a value in a range of values very near its equilibrium value. Because inductor current $i_L$ cannot change instantaneously, it typically remains above its equilibrium value for a short time (as shown in FIG. 4). This causes output potential $V_{out}$ to rise above its regulated value (e.g., between times T1 and T2 as shown in FIG. 5).

We shall use the expression "switching regulator" chip herein to denote a circuit which performs the functions of a "switching controller" chip (e.g., controller 1 of FIG. 1 or controller 101 of FIG. 2) but which also includes an on-board power switch. In contrast, a "switching controller" chip does not include an on-board power switch and must be used with an external power switch (as controller chip 1 of FIG. 1 is used with an NMOS transistor N1 which is external to chip 1). Switching controller chip 1 of FIG. 1 is an example of a "current mode" switching controller chip. There are other types of switching controller and regulator chips (such as voltage mode switching controllers) which can be implemented in accordance with the invention, some of which work without an external sense resistor while others require an external sense resistor.

Some conventional DC-to-DC converters differ from the conventional circuits of FIGS. 1 and 2 (and that of FIG. 6 to be discussed below) in that they include a switching regulator chip (e.g., a current mode switching regulator chip) in place of a switching controller chip. The switching regulator chip in such a converter typically does not include a sense resistor, and instead is typically used with an external sense resistor (such as resistor $R_s$ of FIG. 1). For example, one such converter employs a current mode switching regulator chip that differs from chip 1 of FIG. 1 in that counterparts to NMOS transistor N1 and resistors $R_{f1}$ and $R_{f2}$ are implemented on-board the regulator chip. In this type of converter, the circuitry external to the regulator chip does not include an external power switch, but it does include an external sense resistor (e.g., an external sense resistor identical to resistor $R_s$ of FIG. 1). Conventional converters which include regulator chips are also subject to the above-noted disadvantages of the circuits of FIGS. 1 and 2, unless they are implemented with soft start circuitry.

We next describe soft start circuitry of the type conventionally employed to avoid overshoot in DC-to-DC converters. FIG. 6 is a schematic diagram of a conventional DC-to-DC converter which is identical to that of FIG. 2 except in that it includes conventional soft start circuitry. The soft start circuitry comprises circuitry (to be described) within controller chip 102, and switch $S_1$ and capacitor $C_{soft}$ which are external to chip 102. Chip 102 is identical to chip 101 of FIG. 2, except in that chip 102 includes soft start circuitry (including current source $1_{soft}$) to be described below.

In operation of the FIG. 6 converter, at time t=0 (when the "soft start" start up operation begins), switch $S_1$ is opened to cause capacitor $C_{soft}$ to start charging up at a rate of $1_{soft}/C_{soft}$. In response to the actual voltage across soft start capacitor $C_{soft}$, controller chip 102 limits the duty cycle of switch N1. Initially during a soft start, controller 102 causes the duty cycle of N1 to be very low since the voltage across $C_{soft}$ is low. As the voltage across $C_{soft}$ rises, the duty cycle of N1 is allowed to increase until it reaches its equilibrium value. The capacitance of $C_{soft}$ is chosen so that there is minimal overshoot for a given application.

The soft start circuitry implemented as part of controller chip 102 includes current source $1_{soft}$ (connected to capacitor $C_{soft}$ as shown in FIG. 6), an OR gate, and an overvoltage comparator (not shown in FIG. 6) having an inverting input coupled to the top plate of capacitor $C_{soft}$ and a noninverting input coupled to receive the feedback potential $V_{fb}$ from Node A (between resistors $R_{F1}$ and $R_{F2}$) The output of the overvoltage comparator is asserted to one input of the OR gate. The other input of the OR gate receives the normal reset signal (e.g., a reset signal of the type asserted from comparator 8 of FIG. 2 to trigger the switching off of transistor N1). The circuitry is configured so that the voltage across capacitor $C_{soft}$ increases more rapidly than does the feedback potential $V_{fb}$, so that, at the start of the start up period, the output of the overvoltage comparator is a logical "1" which forces the output of the OR gate to a level which triggers the prompt switching off of transistor N1 (promptly after each time that N1 switches on) regardless of the level of the normal reset signal. As the start up period progresses, the output of the overvoltage comparator begins to transition from a logical "0" to a logical "1" at progressively later times (relative to each event of switching on transistor N1). When the output of the overvoltage comparator is a logical "0," the output of the OR gate depends on the value of the normal reset signal (and indeed it follows the normal reset signal). As a result, the duty cycle of transistor N1 gradually increases from the start to the end of the start up period. At the end of the start up period, the voltage across capacitor $C_{soft}$ has become so large that the output of the overvoltage comparator remains at a logical "0," so that the output of the OR gate follows the normal reset signal.

FIG. 7 is a graph of the voltage asserted by controller chip 102 of the FIG. 6 circuit between the gate and source of NMOS transistor N1, during start up of the FIG. 6 circuit. Consistent with the foregoing description, FIG. 7 shows that the duty cycle of transistor N1 gradually increases from the start to the end of the start up period. After the end of the start up period, the duty cycle of transistor N1 is regulated in normal fashion (i.e., as it is during steady state operation of the FIG. 2 circuit) in response to the potential at Node B of FIG. 6.

FIG. 8 is a graph of the current $i_L$ through inductor L1 of FIG. 6 during the start up period, showing that the average value of this current rises gradually during start up. FIG. 9 is a graph of the output potential $V_{out}$ of FIG. 6 during the start up period, showing that the value of the output potential rises gradually during start up (without overshoot) from its initial value (zero) to its regulated (steady state) value.

Because the duration of the soft start operation is typically on the order of milliseconds, large capacitance values of $C_{soft}$ are required when using typical values of $I_{soft}$ (which is generated on chip 102). Such large values of $C_{soft}$ are too large for capacitor $C_{soft}$ to be implemented on-board chip 102, so that an external pin is required to connect an external $C_{soft}$ with the portion of the soft start circuitry which is on-board chip 102. This is a disadvantage since in some applications, it is not practical (or it is undesirable) to implement a controller (or regulator) chip with an extra external pin for connection to a soft start capacitor.

In some conventional current mode switching controllers, an external compensation capacitor (corresponding to capacitor $C_c$ of FIGS. 2 and 6, which is coupled to chip 101 or 102 at the pin labeled "COMP") is employed for two functions: it performs its normal compensation function; and it also functions as a soft start capacitor. This eliminates the need for a separate external soft start capacitor (and an additional external pin for coupling the chip to a separate external soft start capacitor), but it has the disadvantage of making optimization of the dual function capacitor value difficult or impossible, since a trade off in the capacitance value will typically be required to satisfy all of the compensation, overshoot, and transient response requirements.

SUMMARY OF THE INVENTION

In a class of embodiments, the invention is a DC-to-DC converter which includes a switching controller or regulator (e.g., a current mode switching controller or regulator) implemented as an integrated circuit, and circuitry (typically but not necessarily including a current sense resistor) external to the controller (or regulator) chip, where the controller (or regulator) chip includes soft start circuitry but requires no component external thereto (other than the external circuitry present in DC-to-DC converters having no soft start capability) in order to accomplish a soft start. Another aspect of the invention is a controller (or regulator) chip for use in such a converter.

In preferred embodiments, the inventive controller (or regulator) chip includes an on-board capacitor, charging circuitry for charging the capacitor during a soft start period, an overvoltage comparator coupled and configured to compare the voltage across the capacitor with a feedback potential (proportional to the output potential of a DC-to-DC converter with which the controller or regulator chip is used), and an OR gate having a first input coupled to receive the output of the comparator and a second input coupled to receive a PWM reset signal (the signal which, during steady state operation of the controller or regulator chip, triggers the switching off of the DC-to-DC converter's power transistor). Preferably, the charging circuitry is configured to charge the capacitor intermittently, with a duty cycle selected to allow the capacitor to have capacitance below a desired value, while the capacitor is capable of being charged to a voltage not less than the target value of the feedback potential during steady state operation of the DC-to-DC converter, with gradually increasing voltage across the capacitor over the entire duration of the soft start period. In some such preferred embodiments, the charging circuitry includes a switch (e.g., transistor N2 of FIG. 10 or 13) having a first state which allows charging of the capacitor and a second state which prevents charging of the capacitor, and a one shot circuit coupled to the switch and configured to assert a pulse train to the switch, wherein the pulse train consists of pulses that occur with period T, and the pulse train causes the switch to enter the first state at times coinciding with the switching on of the DC-to-DC converter's power transistor and to enter the second state at a time P after each time that the switch enters the first state, where P is substantially less than T. In other ones of the preferred embodiments, the inventive controller (or regulator) chip includes logic circuitry coupled to the output of the overvoltage comparator, and configured to generate a control signal which prevents the power switch (of the DC-to-DC converter with which the chip is used) from switching on when the feedback potential rises above the voltage across the capacitor (so that the power switch remains "off" until the feedback potential falls below the voltage across the capacitor). Such logic circuitry functions to prevent overshoot during the soft start period, as well as to assist in regulation of the output potential (of the DC-to-DC converter) during steady state operation of the DC-to-DC converter.

In other embodiments, the inventive controller (or regulator) chip includes reset circuitry (including an error amplifier configured to generate a reset control signal in response to relative values of a feedback potential and an effective reference potential), an on-board capacitor, charging circuitry for charging the capacitor (preferably intermittently) during a soft start period, first circuitry coupled to an input of the error amplifier (and configured to assert a reference signal indicative of the effective reference potential to said input of the error amplifier), and second circuitry coupled to a second input of the error amplifier (and configured to assert a signal indicative of the feedback potential to said second input of the error amplifier). The feedback potential is proportional to the output potential of a DC-to-DC converter with which the controller or regulator chip is used. The reset circuitry is configured to generate an "off" signal for switching off a power switch of the DC-to-DC converter (each time after the power switch has been turned on) in response to the reset control signal, during both a soft start period and a steady state mode. The first circuitry has a first node coupled to the capacitor and a second node coupled to receive a reference potential (which remains at least substantially fixed during the soft start period and steady state mode), and is configured so that the effective reference potential is indicative of a linear combination of the reference potential and the voltage across the capacitor during the soft start period (so that the reference signal varies with the changing capacitor voltage during the soft start period), but so that the effective reference potential is the reference potential (and does not depend on the voltage across the capacitor) during the steady state mode (so that the reference signal remains at least substantially fixed during the steady state mode). The first circuitry, the second circuitry, the capacitor, and the charging circuitry comprise soft start circuitry which prevents the instantaneous value of the feedback potential from varying significantly from the instantaneous value of the reference signal during the soft start period. The voltage across the capacitor rises above the reference potential at the end of the soft start period, at which time the controller (or regulator) chip begins to operate in the steady state mode.

The invention is especially useful where it is impractical or undesirable to implement the controller (or regulator) chip with a pin dedicated for connection to an external soft start capacitor (or other soft start component or circuit for performing a soft start operation).

For convenience, the expression "switching controller" integrated circuit (or chip) is used in the claims to denote an integrated circuit in the broad class of integrated circuits consisting of both switching regulators (each including an on-board power switch) and switching controllers (which do not include on-board power switches, but are used with external power switches to perform the same functions performed by current mode switching regulators). The invention pertains both to current mode switching controller chips and other switching controller chips (such as voltage mode switching controller chips), and to switching controller chips which work without external sense resistors as well as switching controller chips which require external sense resistors.

Another aspect of the invention is a method for performing DC-to-DC conversion using a switching controller chip and external circuitry coupled to the controller chip to generate an output potential which increases to a regulated value during a soft start period and remains at the regulated value during steady state operation, wherein the controller chip is configured to generate a PWM reset signal in response to a first feedback signal from the external circuitry and to switch off a power transistor in response to the PWM reset signal during said steady state operation, wherein the external circuitry develops a second feedback potential which is proportional to the output potential, the second feedback potential is regulated so as not to significantly exceed a target value, and the controller chip includes a soft start capacitor, said method including the steps of:

(a) operating circuitry internal to (on board) the controller chip to commence charging of the soft start capacitor at the start of the soft start period, and continuing to charge the soft start capacitor;

(b) while performing step (a), comparing the voltage across the soft start capacitor with the second feedback potential to generate a first signal indicative of whether the voltage across the soft start capacitor exceeds the second feedback potential; and (c) asserting the first signal and the PWM reset signal to an OR gate internal to the controller chip thereby causing the OR gate to assert a control signal, and switching off the power transistor in response to the control signal during the soft start period. Preferably, the soft start period has a duration, and step (a) includes the step of charging the soft start capacitor intermittently, thereby gradually increasing the voltage across the soft start capacitor to a value not less than the target value over the duration of the soft start period.

DETAILED DESCRIPTION OF THE PREFERRED EMBODIMENTS

A preferred embodiment of the inventive current mode switching controller (implemented as an integrated circuit) will be described with reference to FIGS. 10 and 11, and a DC-to-DC converter which includes controller chip 103 of FIG. 10 will be described with reference to FIG. 13.

Figure 1:
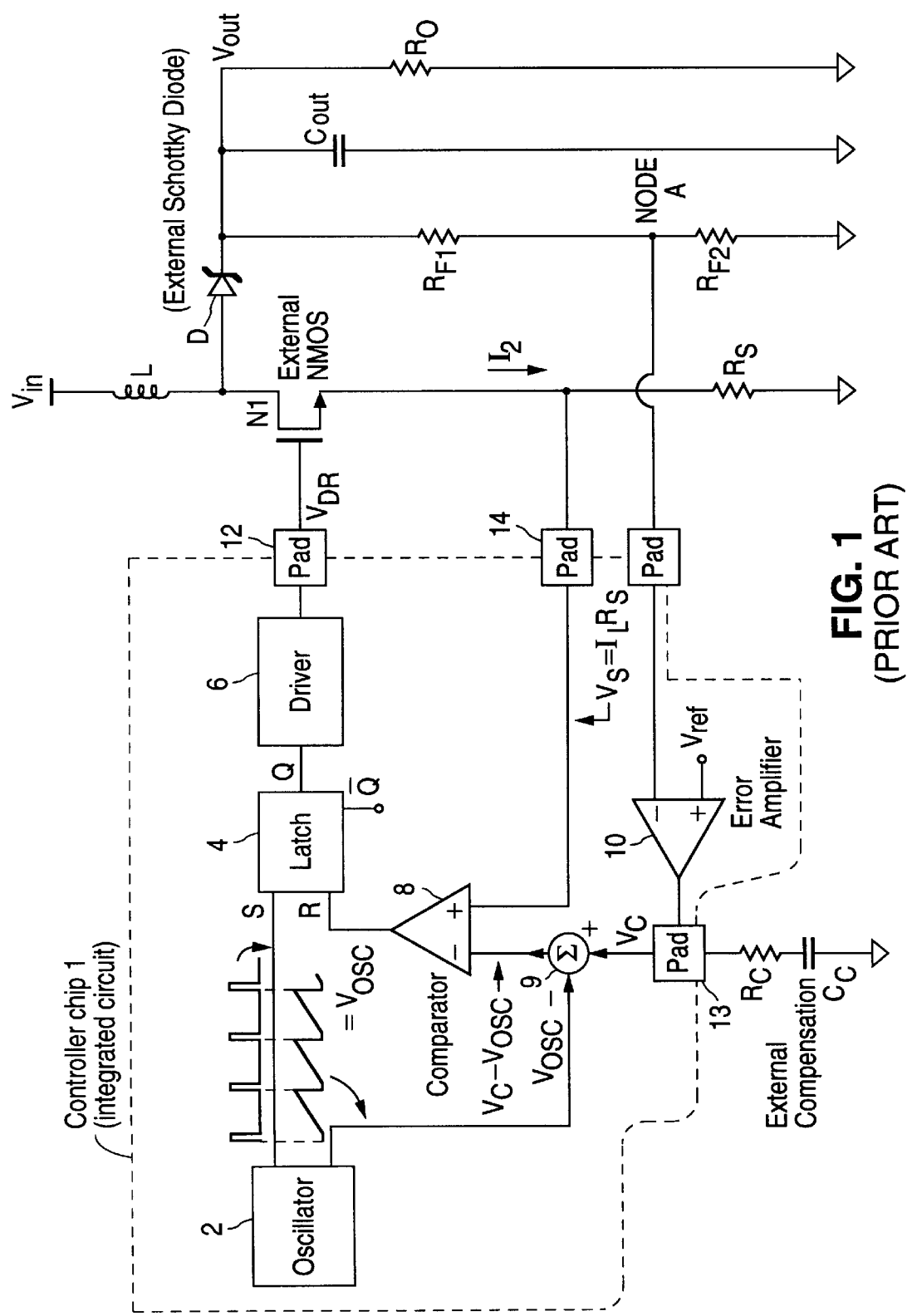
FIG. 1 is a schematic diagram of a conventional DC-to-DC converter including external boost controller circuitry, but including no soft start circuitry.

Current mode switching controller chip 103 of FIG. 1 includes all the elements of conventional controller chip 1 (of FIG. 1), and additionally includes soft start circuitry which comprises NMOS transistor N2, resistor $R_1$ (connected between a supply potential $V_1$ and the drain of transistor N2), one shot circuit 20 (which receives the fixed frequency clock pulse train produced by oscillator 29, and asserts in response a pulse train to the gate of transistor N2), soft start capacitor $C_1$ (connected between ground and the source of transistor N2), overvoltage comparator 21, and OR gate 22. The inverting input of comparator 21 is coupled to the top plate of capacitor $C_1$ and is thus at a potential $V_{ov}$ above ground (where $V_{ov}$ is the voltage across capacitor $C_1$). The noninverting input of comparator 21 is coupled (through an external pin of chip 103) to receive the feedback potential $V_{fb}$ from the external circuitry of the DC-to-DC converter with which controller chip 103 is used (e.g., feedback potential $V_{fb}$ from Node A between resistors $R_{F1}$ and $R_{F2}$ of FIG. 1 or FIG. 2). The output of overvoltage comparator 21 is asserted to one input of OR gate 22. The other input of the OR gate receives the normal PWM reset signal (i.e., the reset signal asserted from comparator 8 of FIG. 1 to latch 4 to trigger the switching off of external power transistor N1). FIG. 10 shows oscillator 29 (which can be identical to oscillator 2 of FIG. 1) but does not show the other elements thereof which are identical to those of controller 1 of FIG. 1. Oscillator 29 can be implemented differently than oscillator 2 of FIG. 1. For example, oscillator 2 of FIG. 1 can have adjustable output frequency, whereas oscillator 29 of FIG. 10 can be implemented more simply so as to have fixed output frequency.

Figure 6:
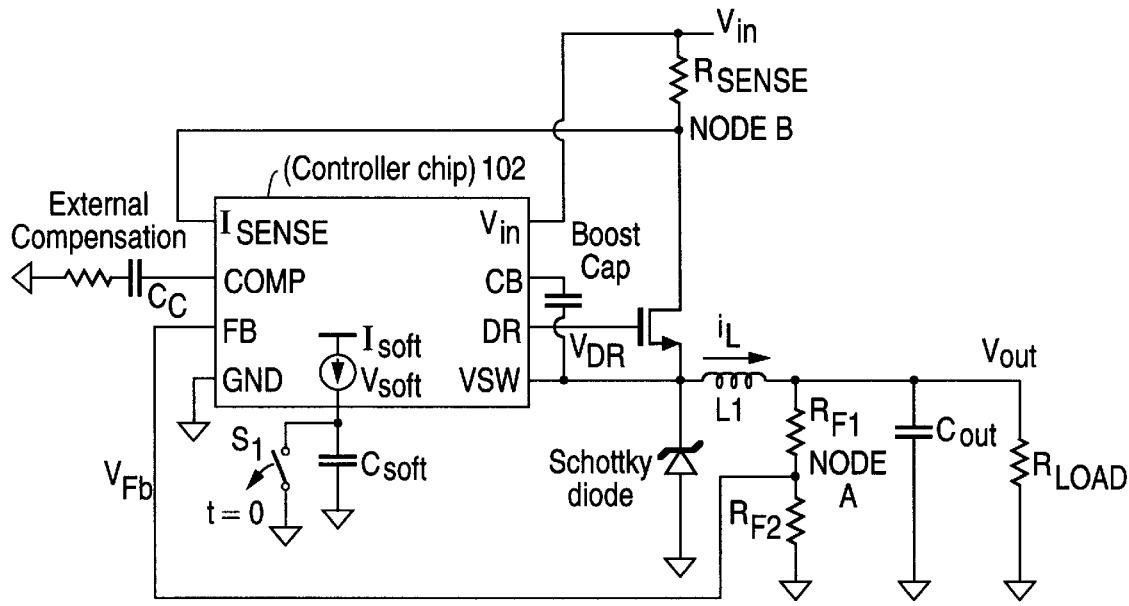
FIG. 6 is a schematic diagram of a conventional DC-to-DC converter, which includes external buck controller circuitry, and conventional soft start circuitry (including an external switch $S_1$ and an external capacitor $C_{soft}$).
Figure 7:
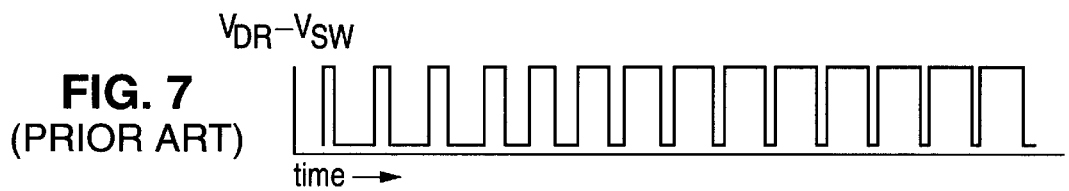
FIG. 7 is a graph of the voltage asserted by controller chip 102 of the FIG. 6 circuit between the gate and source of transistor N1, during start up of the FIG. 6 circuit.
Figure 8:
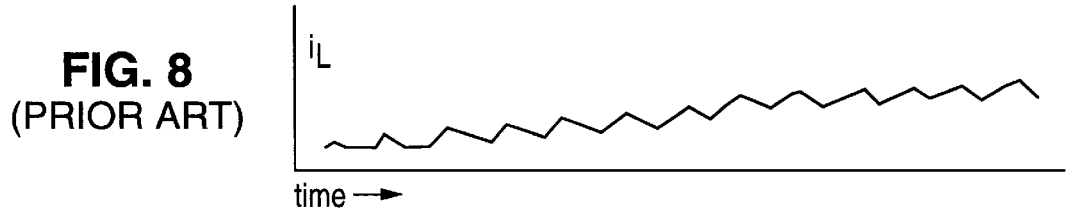
FIG. 8 is a graph of the current $i_L$ through inductor L1 of FIG. 6 during the start up period.
Figure 9:
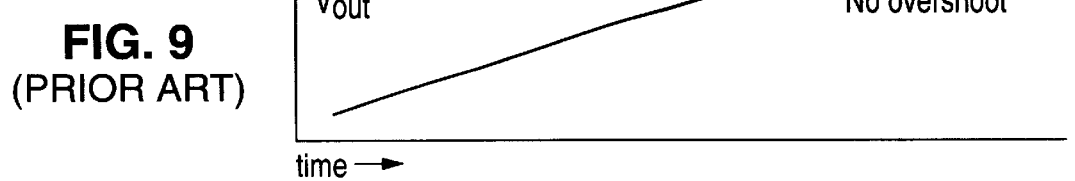
FIG. 9 is a graph of the output potential $V_{out}$ of FIG. 6 during the start up period.

Soft start capacitor $C_1$ has low capacitance, typically in the range from 5 pF to 30 pF, and thus can practically be implemented on board chip 103. In contrast, external soft start capacitor $C_{soft}$ of the conventional circuit of FIG. 6 typically has a much greater capacitance (which is necessary because the soft start period typically has long duration, on the order of milliseconds), and thus it cannot practically be implemented on board a controller chip.

With reference again to FIG. 10, capacitor $C_1$ is not charged with a constant current, but instead is charged in response to current pulses (produced at the output of one shot 20) each having a duration of P seconds (one of the current pulses being asserted every T seconds, where T is greater than P). Circuitry (not shown in FIG. 10) within chip 103 responds to the leading edge of each current pulse at the input of one shot 20 by switching on the external power transistor (e.g., external transistor N1), and thus the leading edge of each output pulse asserted by one shot 20 coincides with the switching on of the external power transistor. Each pulse asserted at the output of one shot 20 turns on transistor N2, allowing charging current flow through resistor $R_1$ and the channel of N2, to capacitor $C_1$. As shown in FIG. 11, the voltage $V_{ov}$ across capacitor $C_1$ increases according to $V_1(1-e^{t/K})$, where time constant K is equal to $(T/P)R_1C_1$. Thus, the described technique for charging capacitor $C_1$ effectively increases the time constant according to which the capacitor charges up by the factor (T/P), which in turn allows capacitor $C_1$ to be implemented (with low capacitance) on board the controller chip while allowing the voltage across capacitor $C_1$ increase gradually to $V_1$ over a soft start period of typical length (i.e., on the order of milliseconds).

Figure 2:
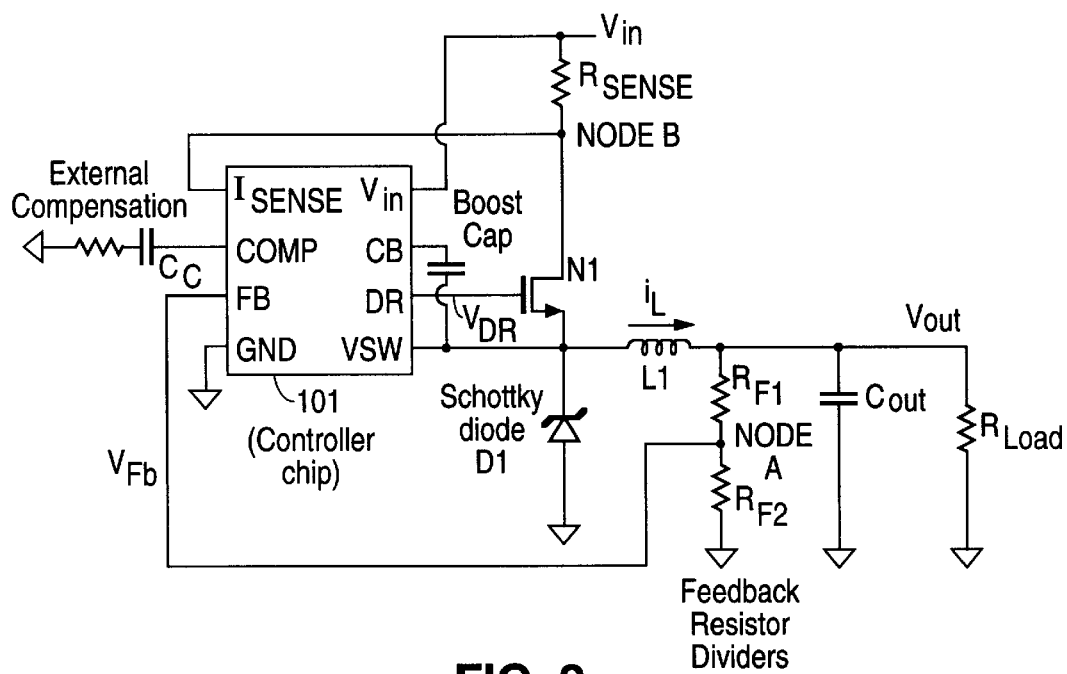
FIG. 2 is a schematic diagram of a conventional DC-to-DC converter including external buck controller circuitry, but including no soft start circuitry.
Figure 3:
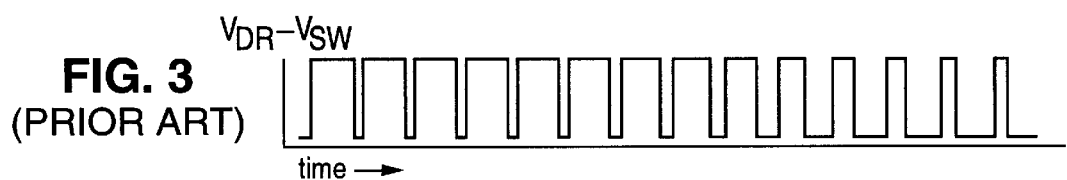
FIG. 3 is a graph of the voltage asserted by controller 101 of the FIG. 2 circuit between the gate and source of transistor N1, during start up of the FIG. 2 circuit.
Figure 4:
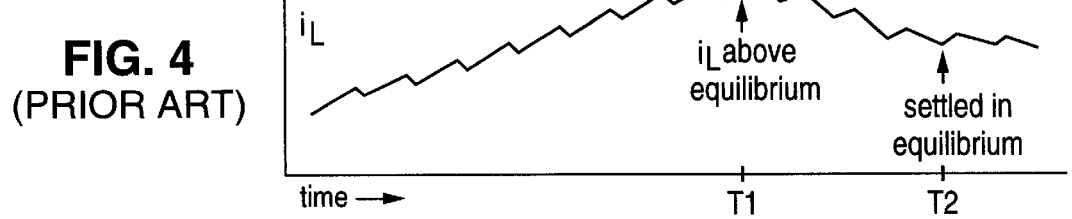
FIG. 4 is a graph of the current $i_L$ through inductor L1 of FIG. 2 during the start up period.
Figure 5:
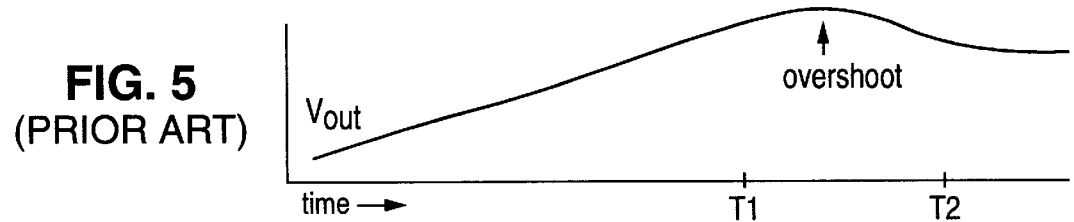
FIG. 5 is a graph of the output potential $V_{out}$ of FIG. 2 during the start up period.

Using overvoltage comparator 21, the voltage $V_{ov}$ across capacitor $C_1$, is compared to the feedback voltage $V_{fb}$ (e.g., feedback potential $V_{fb}$ from Node A of the external circuitry of FIG. 1 or FIG. 2). Comparator 21 effectively forces $V_{fb}$ not to increase faster than $V_{ov}$ during the soft start period. This eliminates (or at least minimizes) overshoot in $V_{fb}$ and therefore eliminates (or at least minimizes) overshoot in the output potential $V_{out}$.

Specifically, at the start of the soft start period, the feedback potential $V_{fb}$ quickly rises above the voltage $V_{ov}$ across capacitor $C_1$, so that the output of overvoltage comparator 21 quickly becomes a logical "1" which forces the output of OR gate 22 to a level that rapidly triggers the switching off of the external power transistor (e.g., external transistor N1). Thus, at the start of the soft start period, the power transistor switches off promptly after each time that it switches on, regardless of the level of the normal PWM reset signal (which is asserted to the second input of OR gate 22). As the soft start period continues, both $V_{ov}$ and $V_{fb}$ increase, but since comparator 21's output will cause the external power transistor to promptly switch off whenever $V_{fb}$ rises above $V_{ov}$, the soft start circuitry prevents $V_{fb}$ from rising significantly above $V_{ov}$ during the soft start period. During a typical soft start operation, comparator 21's output allows the duty cycle of the external power transistor to increase gradually until it approaches its steady state value. By the end of the soft start period, voltage $V_{ov}$ across capacitor $C_1$ has risen above the bandgap reference potential (i.e., the potential $V_{ref}$ asserted to the noninverting input of error amplifier 10 of controller 103). Since the DC-to-DC converter prevents potential $V_{fb}$ from rising above the bandgap reference potential, whenever voltage $V_{ov}$ exceeds the bandgap reference potential, the output of overvoltage comparator 21 is a logical "0" (and thus the output of OR gate 22 depends on, and indeed it follows, the value of the normal PWM reset signal received at the second input of OR gate 22).

Figure 10:
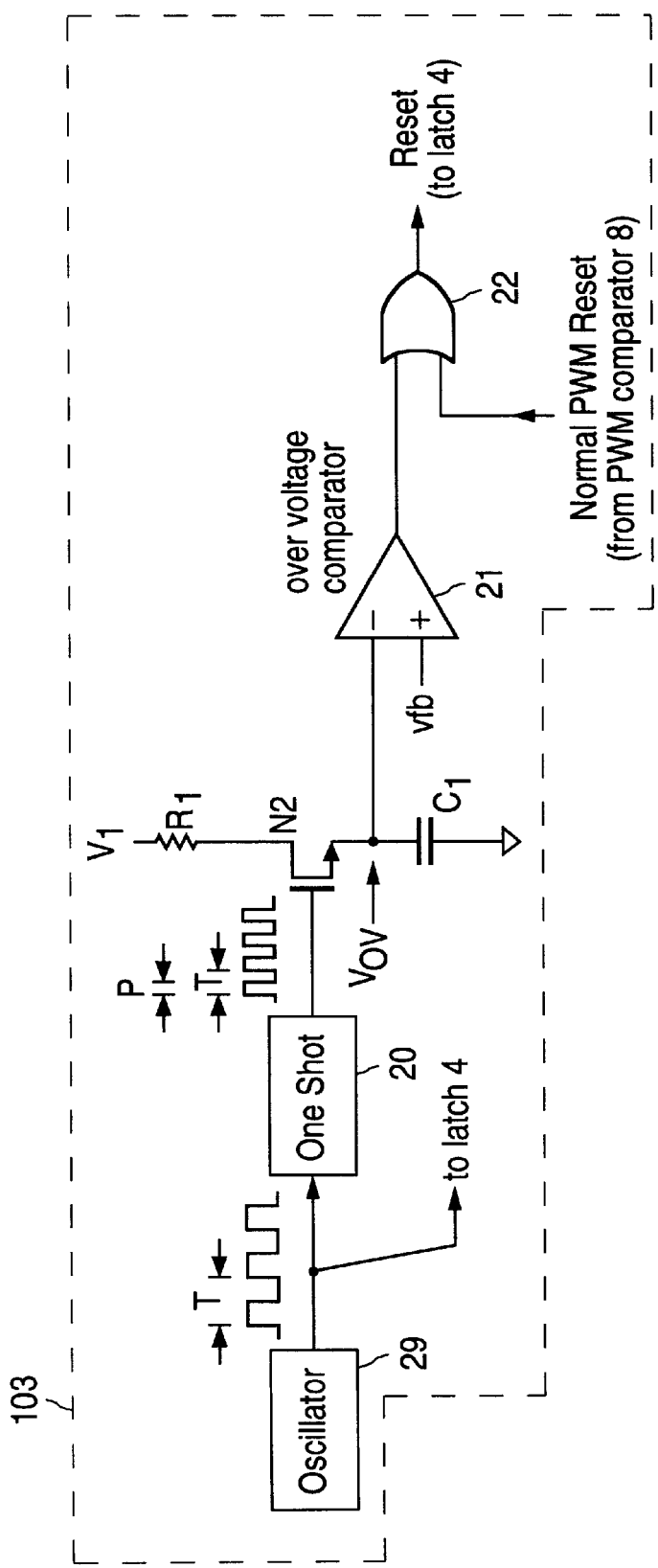
FIG. 10 is a schematic diagram of a preferred embodiment of the soft start circuitry implemented on-board (internal to) a current mode switching controller (or regulator) that embodies the invention.
Figure 11:
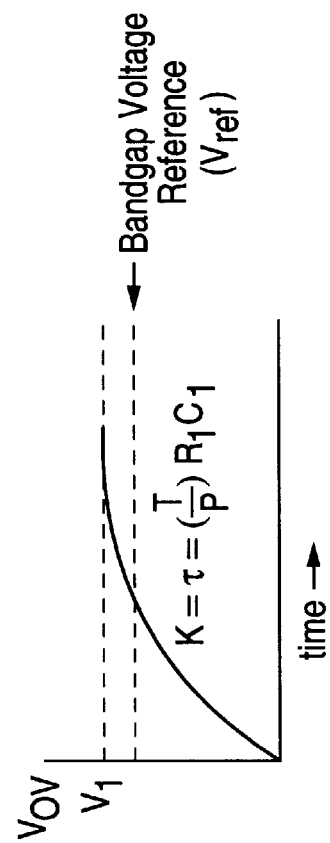
FIG. 11 is a graph of the potential ($V_{ov}$) on the top plate of capacitor $C_1$ in operation of the FIG. 10 circuit, in comparison with the bandgap reference voltage $V_{ref}$ employed in the conventional PWM control loop with which the FIG. 10 circuitry is used.

Essentially, the soft start circuitry of FIG. 10 forces feedback potential $V_{fb}$ to track the potential $(V_{ov})$ on the top plate of capacitor $C_1$ until $V_{fb}$ rises to the bandgap reference potential (identified as $V_{ref}$ in FIG. 11), at which time the soft start period ends and the conventional PWM control loop takes over. The duty cycle of the power transistor (e.g., transistor N1 of FIG. 12) being controlled to regulate the output potential $V_{out}$ increases gradually from the start to the end of the soft start period.

In a typical implementation of FIG. 10, the period T (of the pulses input to one shot 20) is 30 microseconds, the duration P (of each pulse output from one shot 20) is 40 nanoseconds, $R_1$=150 KOhms, and $C_1$=5 pF. Of course, chip 103 should include circuitry (not shown) for discharging capacitor $C_1$ at appropriate times (e.g., prior to each soft start operation).

Figure 12:
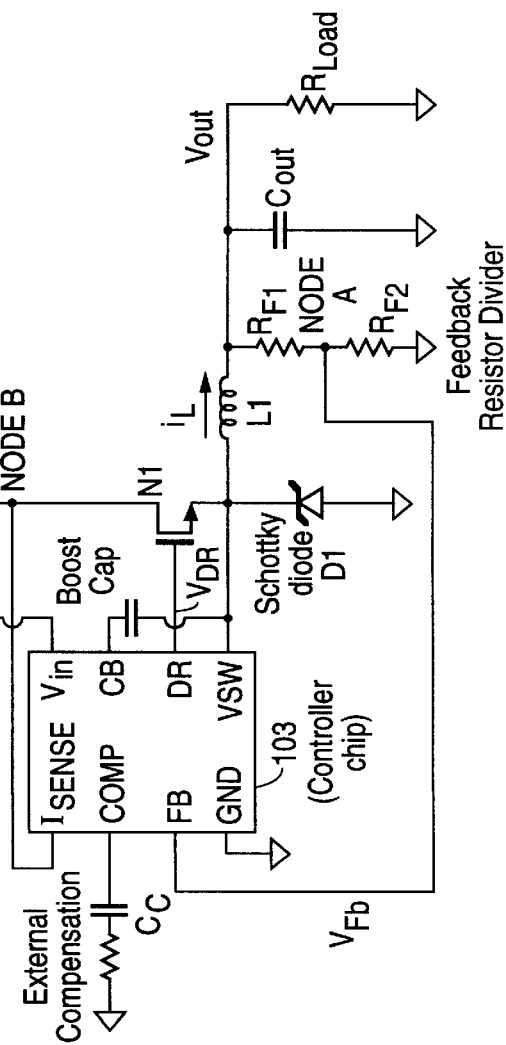
FIG. 12 is a schematic diagram of a DC-to-DC converter which includes a controller chip (integrated circuit 103) which includes the FIG. 10 circuitry.

The DC-to-DC converter of FIG. 12 includes current mode switching controller chip 103 of FIG. 10 (rather than conventional controller chip 101 of FIG. 2), but is otherwise identical to the DC-to-DC converter of FIG. 2. Thus, the FIG. 12 converter implements a soft start operation using soft start circuitry that is entirely implemented on chip 103 (and without external soft start circuitry such as capacitor $C_{soft}$ of FIG. 6). Elements of the circuit of FIG. 12 which are identical to corresponding elements of FIG. 2 are identically labeled in FIGS. 2 and 12, and the foregoing description of these elements will not be repeated with reference to FIG. 12.

Figure 13:
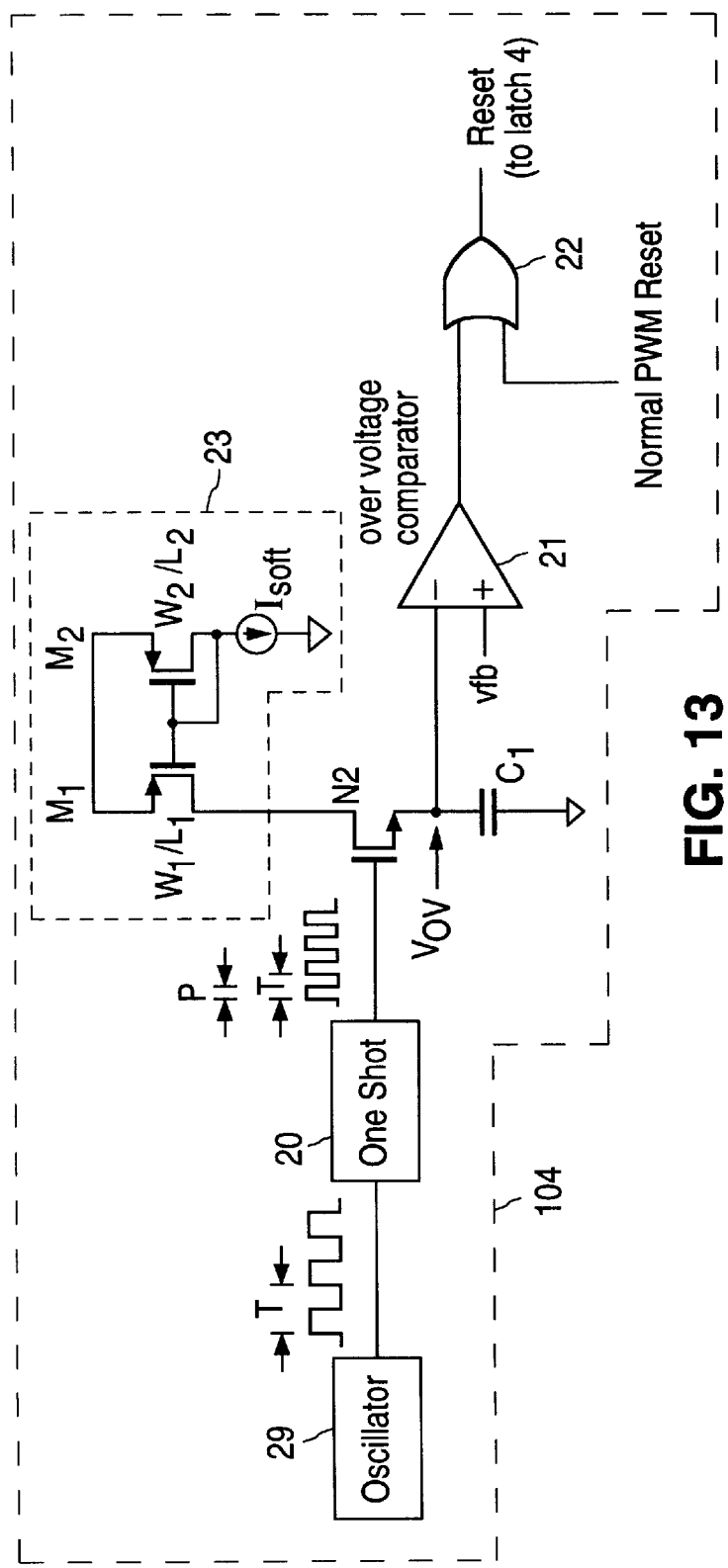
FIG. 13 is a simplified schematic diagram of a variation on the FIG. 10 embodiment.

With reference to FIG. 13, we next describe a variation on the FIG. 10 embodiment. FIG. 13 is a current mode switching controller chip 104 which differs from chip 103 of FIG. 10 only in that resistor R, (of FIG. 10) is replaced by current source circuitry 23. Current source circuit 23 comprises PMOS transistors M1 and M2, whose common gates are connected to the drain of M2 as shown, and current source $1_{soft}$ (which sinks current $1_{soft}$ from the drain of M2. When transistor N2 is switched on, the current flowing from current source circuit 23 through transistor N2 is $1_{soft}(W_1L_2/W_2L_1)$, where $W_1$ and $L_1$ are respectively the channel width and length of transistor M1 and $W_2$ and $L_2$ are respectively the channel width and length of transistor M2.

Figure 14:
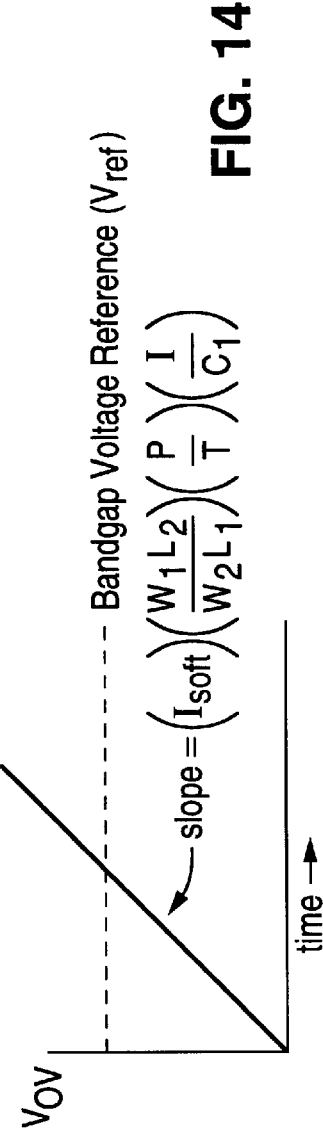
FIG. 14 is a graph of the potential ($V_{ov}$) on the top plate of capacitor Co in operation of the FIG. 13 circuit, in comparison with the bandgap reference voltage $V_{ref}$ employed in the conventional PWM control loop with which the FIG. 13 circuitry is used.

In operation of controller 104 of FIG. 13, the voltage $V_{ov}$ across soft start capacitor $C_1$ increases (in response to each output pulse of duration P from one shot 20) linearly (to within a good approximation) with slope $(1_{soft})(W_1L_2/W_2L_1)(P/T)(1/C_1)$ as indicated in FIG. 14. The described technique for charging capacitor $C_1$ effectively increases the time constant according to which the capacitor charges by the factor (T/P), which in turn allows capacitor $C_1$ to be implemented (with low capacitance) on board controller chip 104 while allowing voltage $V_{ov}$ across capacitor $C_1$ to increase gradually to the bandgap reference potential over a soft start period of typical length (i.e., on the order of milliseconds). When controller chip 104 is used in a DC-to-DC converter, the soft start circuitry of controller chip 104 forces feedback potential $V_{fb}$ to track the potential ($V_{ov}$) on the top plate of capacitor $C_1$ until $V_{fb}$ rises to the bandgap reference potential (identified as $V_{ref}$ in FIG. 14), at which time the soft start period ends and the conventional PWM control loop of the DC-to-DC converter takes over. The duty cycle of the power transistor (e.g., transistor N1 of FIG. 12) being controlled to regulate the DC-to-DC converter's output potential $V_{out}$ increases gradually from the beginning to the end of the soft start period.

Another embodiment of the invention will be described with reference to FIG. 15. Current mode switching controller chip 203 of FIG. 15 includes all the elements of conventional controller chip 1 (of FIG. 1), and additionally includes soft start circuitry which comprises NMOS transistor N2, resistor $R_1$ (connected between a supply potential $V_1$ and the drain of transistor N2), one shot circuit 20 (which receives the fixed frequency clock pulse train produced by oscillator 29, and asserts in response a pulse train to the gate of transistor N2), soft start capacitor $C_1$ (connected between ground and the source of transistor N2), current sources $1_{1A}$ and $1_{1B}$ and PMOS transistors P1, P2, and P3, connected as shown. The gate of transistor P3 is coupled (through an external pin of chip 203) to receive the feedback potential $V_{fb}$ from the external circuitry of the DC-to-DC converter with which controller chip 203 is used (e.g., feedback potential $V_{fb}$ from Node A between resistors $R_{F1}$ and $R_{F2}$ of FIG. 1 or FIG. 2). The gate of transistor P2 is coupled to receive bandgap reference potential $V_{ref}$ (e.g., the same reference potential asserted to the noninverting input of error amplifier 10 of FIG. 1). Oscillator 29, one shot 20, resistor $R_1$, transistor N2, and capacitor $C_1$ are identical to (and function in the same way as) the identically numbered elements of FIG. 10. Current sources $1_{1A}$ and $1_{1B}$ are matched current sources, and PMOS transistors P2 and P3 are matched transistors. The sources of transistors P1 and P2 are coupled to the noninverting terminal of error amplifier 10, and the source of transistor P3 is coupled to the inverting terminal of error amplifier 10. Error amplifier 10 is identical to error amplifier 10 of FIG. 1, but its inputs (which are high impedance inputs) are coupled to different circuit elements than in FIG. 1. As in FIG. 1, the output of error amplifier 10 (with potential $V_{osc}$ subtracted therefrom) undergoes comparison (in comparator 8) with a feedback potential to determine reset pulses for latch 4. However, in chip 203 of FIG. 15, the output of error amplifier 10 is controlled during a soft start period to implement a soft start of chip 203.

Figure 15:
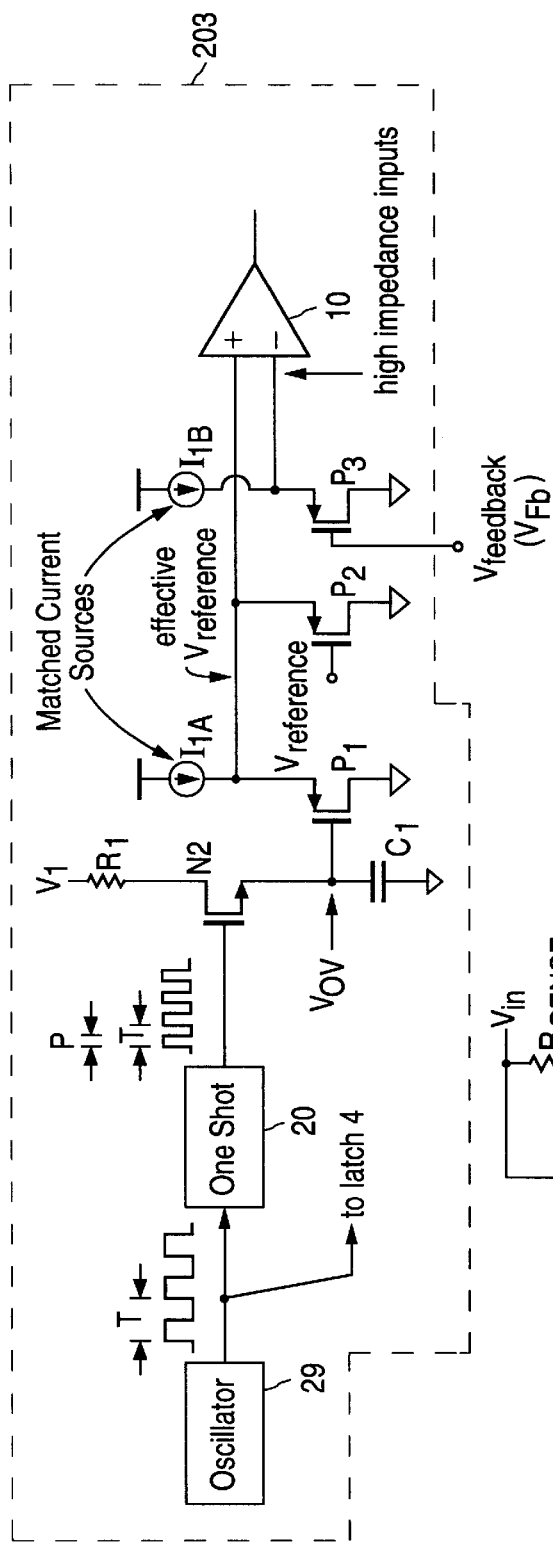
FIG. 15 is a schematic diagram of another embodiment of soft start circuitry implemented in accordance with the invention on-board a current mode switching controller (or regulator).

Specifically, at the start of the soft start period, the voltage across capacitor $C_1$ of FIG. 15 is sufficiently low that all (or substantially all) the current from current source $1_{1A}$ flows through the channel of transistor P1, so that error amplifier 10 behaves as if transistor P1 were omitted and reference potential $V_{ref}$ were very low. Thus, at the start of the soft start period, each time after the external power transistor (e.g., external transistor N1) switches on, the feedback potential $V_{fb}$ (at the gate of P3) quickly rises above the potential at the gate of P1, so that the output of error amplifier 10 quickly reaches a level which causes the rapid switching off of the external power transistor. Thus, at the start of the soft start period, the power transistor is switched off promptly after each time that it is switched on. As the soft start period continues, $V_{ov}$ (and thus the gate potential of P1) increases while $V_{ref}$ remains fixed, so that a progressively smaller share of the current from source $1_{1A}$ flows through P1 and a progressively larger share of the current from source $1_{1A}$ flows through P2, so that error amplifier 10 behaves as if transistor P1 were omitted and an effective reference potential $V_{eref}$ were asserted to the gate of P2 (where $V_{eref}$ increases during the soft start period, but $V_{eref}$ remains less than $V_{ref}$ during the soft start period). Thus, as the soft start period continues, all of $V_{ov}$ (and thus the gate potential of P1), $V_{fb}$ (and thus the gate potential of P3), and the duty cycle of the external power transistor increase, but the soft start circuitry prevents the potential $V_{fb}$ from rising significantly above the potential $V_{eref}$ during the soft start period. During a typical soft start operation, error amplifier 10's output causes the duty cycle of the external power transistor to increase gradually until the duty cycle approaches its steady state value. At the end of the soft start period, voltage $V_{ov}$ across capacitor $C_1$ rises above the bandgap reference potential $V_{ref}$ so that all (or substantially all) current from source $1_{1A}$ flows through the channel of transistor P2 (typically, at the end of the soft start period $V_{ov}$ rises to a level which turns off transistor P1), and chip 203 begins to operate in its steady state mode (i.e., as if it did not include soft start circuitry P1, $C_1$, N2, and 23) in which it regulates the output potential of the DC-to-DC converter so that feedback potential $V_{fb}$ does not vary significantly from reference potential $V_{eff}$.

Figure 16:
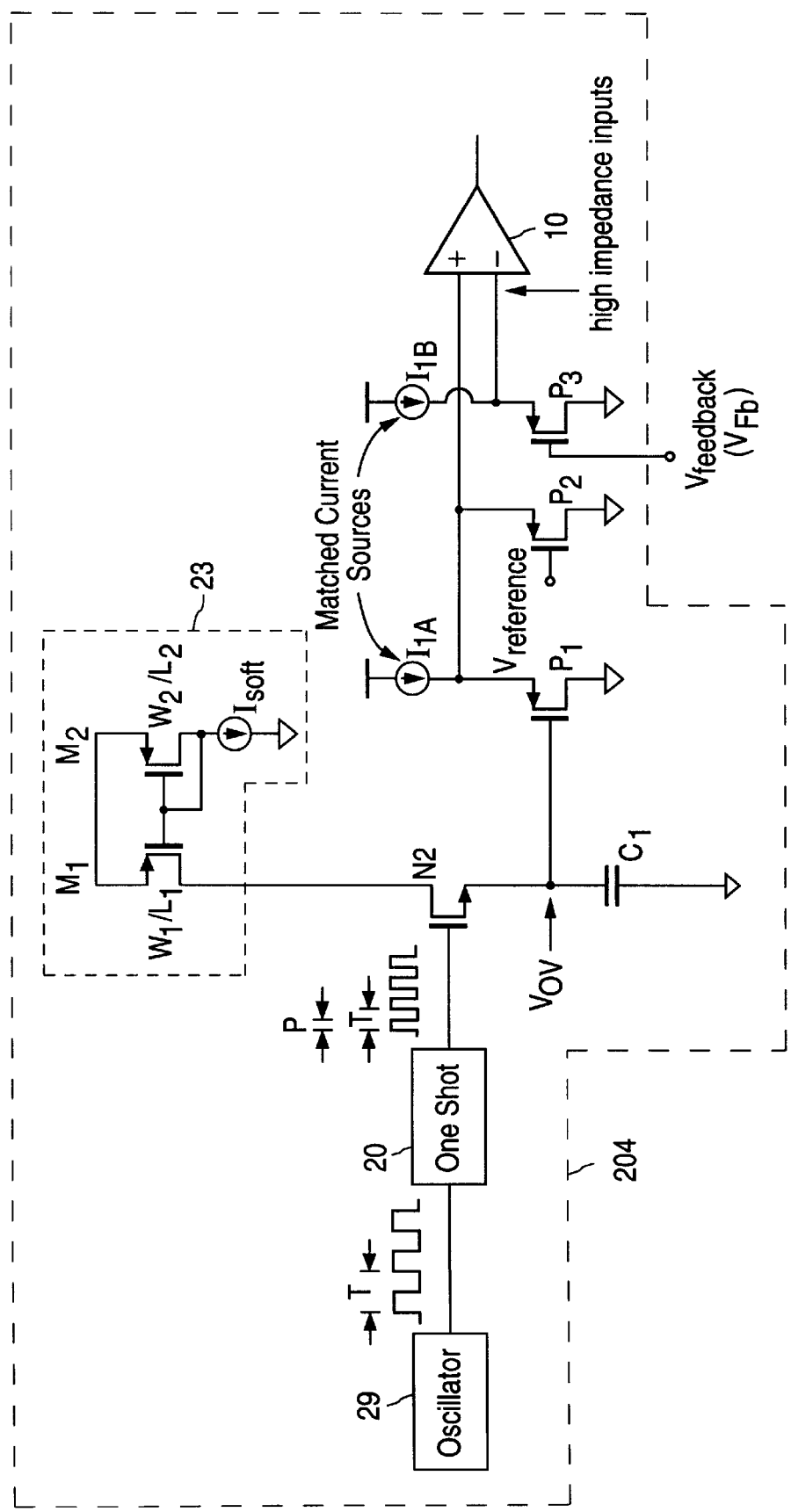
FIG. 16 is a schematic diagram of a variation on the soft start circuitry of FIG. 15.

Current mode switching controller chip 204 of FIG. 16 is a variation on chip 203 of FIG. 15. Controller chip 204 of FIG. 16 differs from controller chip 203 of FIG. 15 only in that resistor $R_1$ (of FIG. 15) is replaced by current source circuitry 23 (which is identical to circuitry 23 of FIG. 13). Controller 204 implements a soft start operation in essentially the same way as does controller 203, but the characteristics of current source circuitry 23 determine the rate at which soft start capacitor $C_1$ charges (during each portion of the charging cycle in which transistor N2 is switched on).

Figure 17:
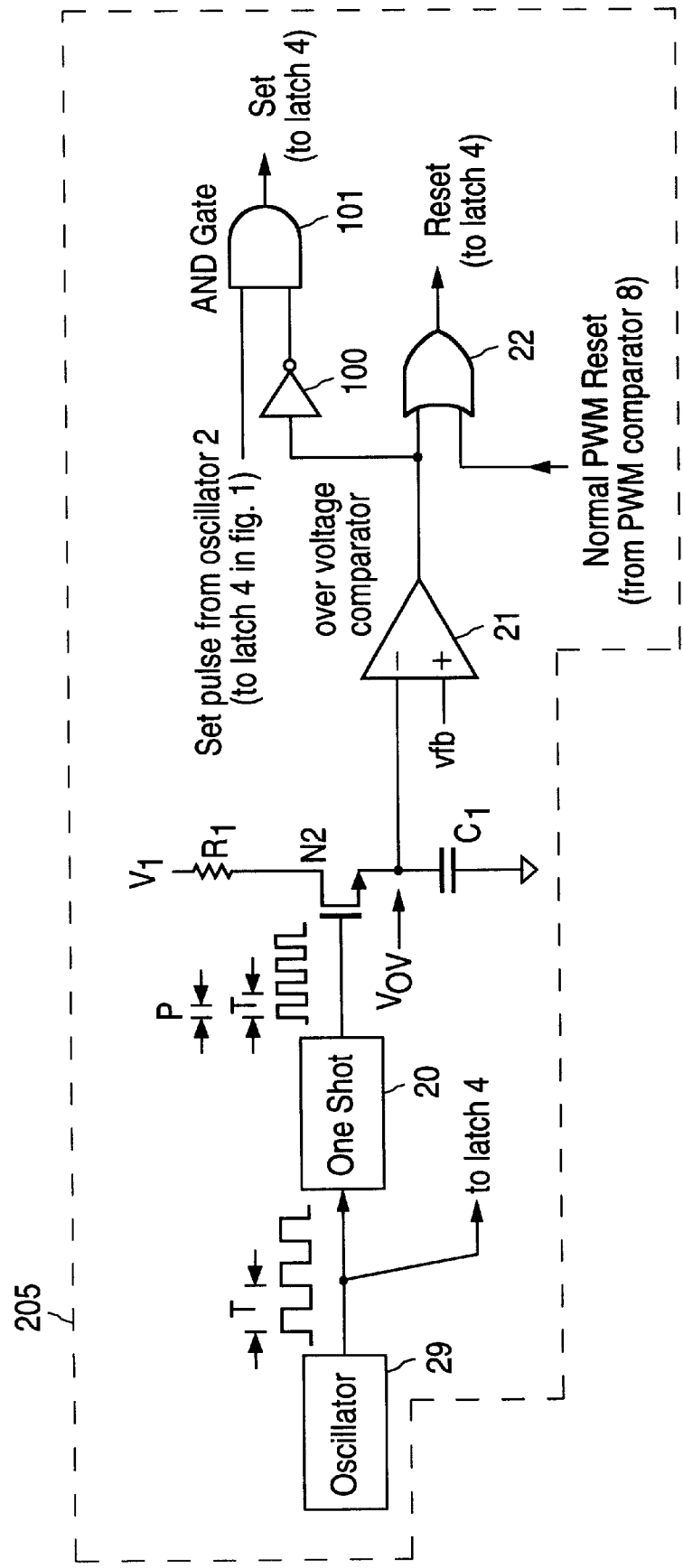
FIG. 17 is a schematic diagram of another embodiment of soft start circuitry implemented in accordance with the invention on-board a current mode switching controller (or regulator).

Another embodiment of the invention will be described with reference to FIG. 17. Controller chip 205 of FIG. 17 is identical to controller chip 103 of FIG. 10, except in that chip 205 includes two additional components: inverter 100 and AND gate 101. The first input of AND gate 101 is connected between the "set" pulse train output of oscillator 2 of FIG. 1, and the "set" input of latch 4 of FIG. 1. Inverter 100 inverts the output of overvoltage comparator 21 and asserts the inverted output of comparator 21 to the second input of AND gate 101. The function of inverter 100 and AND gate 101 is to prevent assertion to the "set" input of latch 4, of the "set" pulse train output from oscillator 2, at times when feedback potential $V_{fb}$ (from the external circuitry used with chip 205) exceeds the voltage $V_{ov}$ across soft start capacitor $C_1$. Specifically, when potential $V_{fb}$ (which is proportional to the output potential of the DC-to-DC converter of which controller chip 205 is a part) rises above voltage $V_{ov}$, the output of inverter 100 becomes a logical "0," so that AND gate is prevented from passing through to its output the set pulse train asserted to its first input (so the power switch of the DC-to-DC converter remains "off" until $V_{fb}$ falls below voltage $V_{ov}$). Thus, elements 100 and 101 function to prevent overshoot during a soft start period (in which capacitor $C_1$ is charged), as well as to assist in regulation of the output which chip 20 the DC-to-DC converter of which chip 205 is a part) during steady state operation of the DC-to-DC converter.

A variation on the FIG. 17 embodiment will next be described with reference to FIG. 18. Controller chip 206 of FIG. 18 is identical to controller chip 104 of FIG. 13, except in that chip 206 includes two additional components: inverter 100 and AND gate 101, connected as shown.

Figure 18:
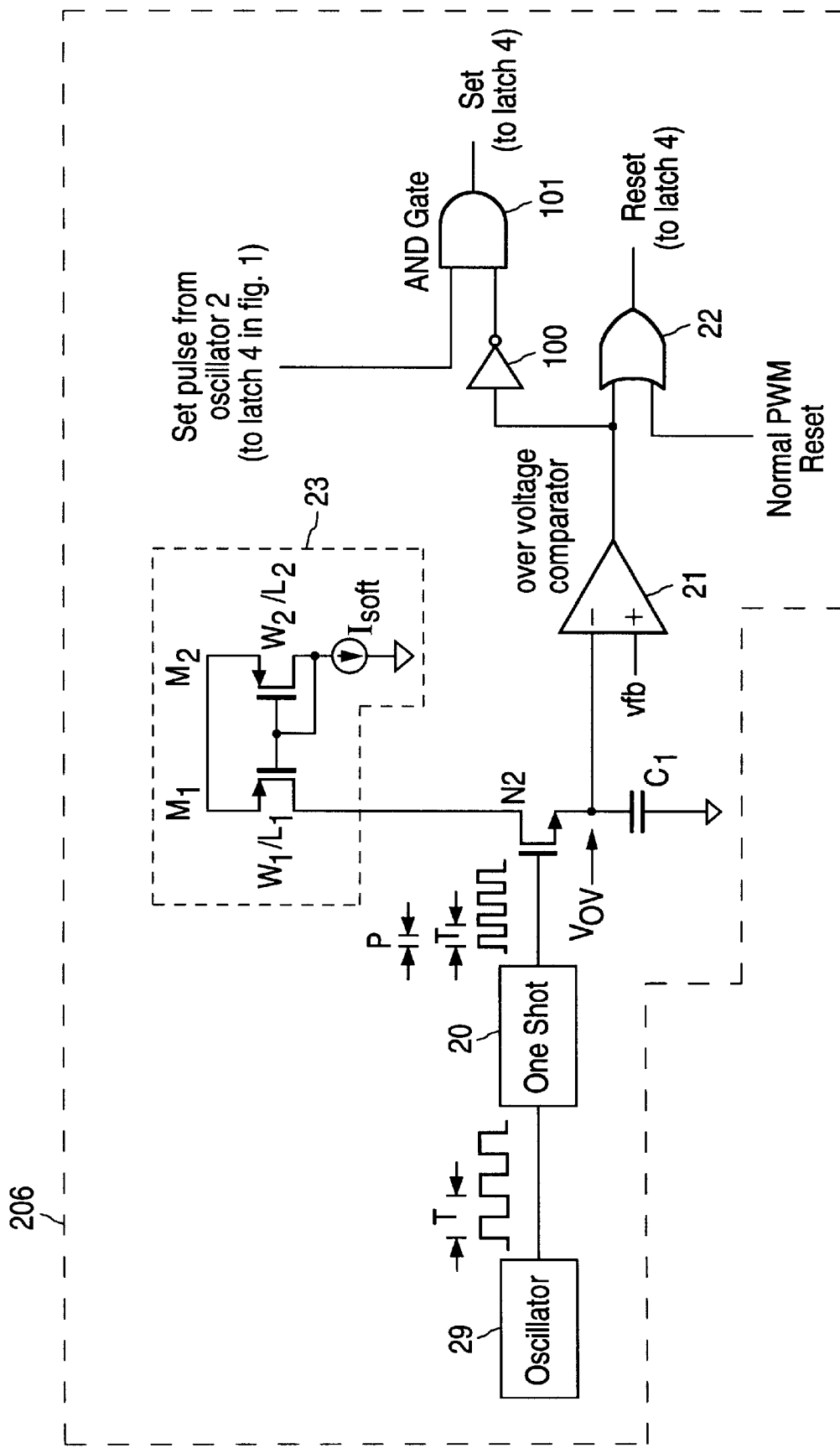
FIG. 18 is a schematic diagram of a variation on the soft start circuitry of FIG. 17.

Inverter 100 and AND gate 101 of FIG. 18 are identical to the identically numbered elements of FIG. 17, and the foregoing description of them will not be repeated with reference to FIG. 18.

Figure 19:
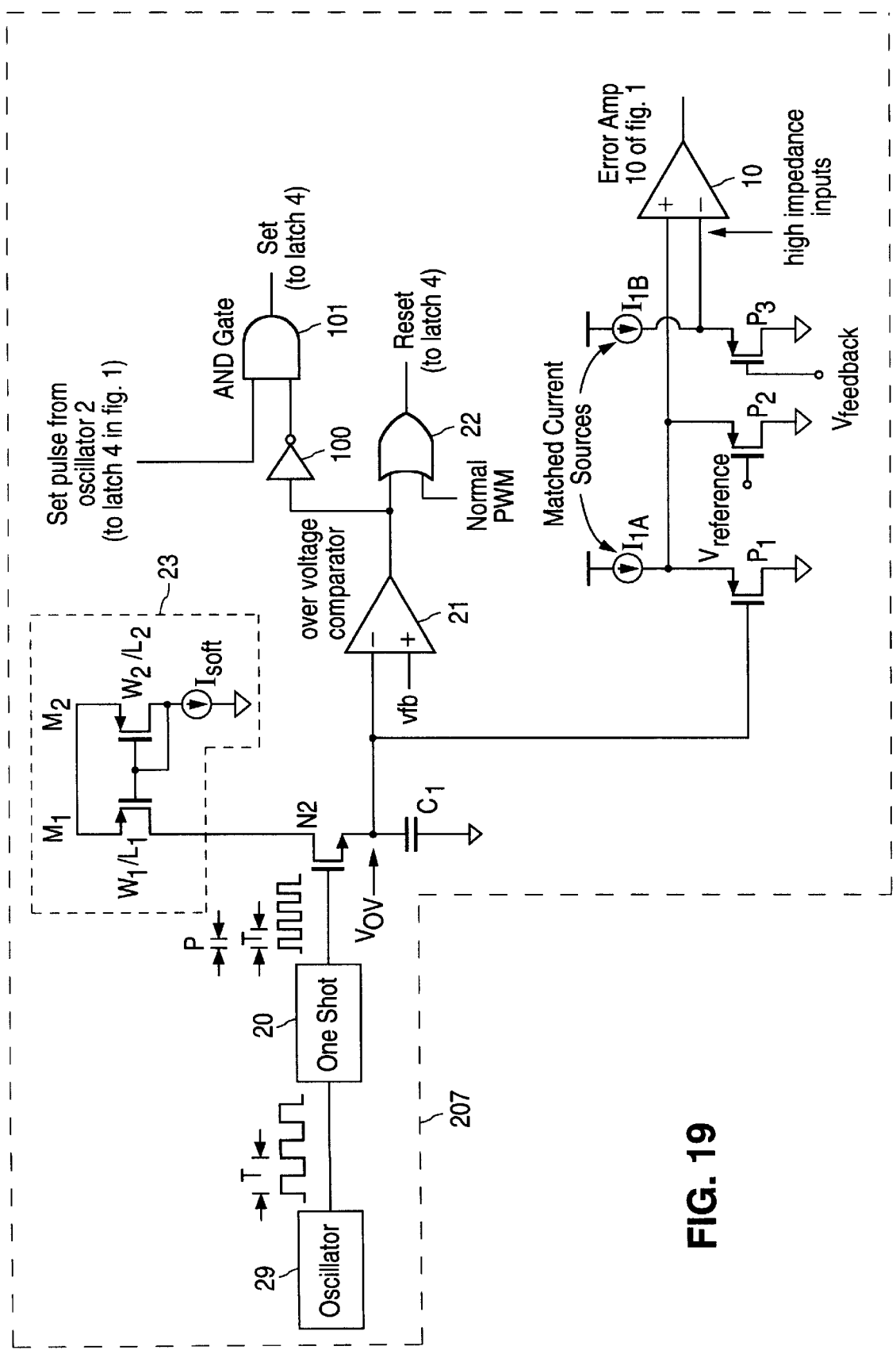
FIG. 19 is a schematic diagram of another embodiment of soft start circuitry implemented in accordance with the invention on-board a current mode switching controller (or regulator).

Another embodiment of the invention, which includes the circuitry of both FIGS. 16 and 18 will be described with reference to FIG. 19. Controller chip 207 of FIG. 19 is identical to controller chip 204 of FIG. 16, except in that chip 207 includes two additional components: inverter 100 and AND gate 101, connected as shown. Inverter 100 and AND gate 101 of FIG. 19 are identical to the identically numbered elements of FIG. 17, and the foregoing description of them will not be repeated with reference to FIG. 19. In chip 207, elements 100 and 101 function to prevent overshoot during a soft start period (as well as to assist in regulation of the output potential of the DC-to-DC converter of which chip 207 is a part during steady state operation of the DC-to-DC converter), and elements P1, P2, P3, $1_{1A}$, $1_{1B}$, and 10 also function (as explained above) to implement a soft start during the soft start period.

In other embodiments, the invention is a DC-to-DC converter which differs from the above-described embodiments only in that the current mode switching controller chip is replaced by a current mode switching regulator chip (with "current mode switching regulator" denoting a circuit which performs all functions of a "current mode switching controller" but which also includes an on-board power switch, in contrast with a "current mode switching controller" chip, which does not include an on-board power switch and must be used with an external power switch), and the external power switch is replaced by the power switch that is implemented on-board the regulator chip. For example, one such embodiment is a variation on that of FIG. 12, in which current mode switching controller chip 103 is replaced by current mode switching regulator chip which includes all elements of chip 103 and also an integrated circuit implementation of NMOS transistor N1 (which functions as a power switch). Also within the scope of the invention is a current mode switching regulator chip for use in a DC-to-DC converter of the type described in this paragraph.

In other embodiments, the invention is a DC-to-DC converter which differs from the above-described embodiments in that the switching controller or regulator chip is not a current mode switching controller or regulator chip (for example, the switching controller or regulator chip can be a voltage mode switching controller or regulator chip).

Although only a number of preferred embodiments have been described in detail herein, those having ordinary skill in the art will certainly understand that many modifications are possible without departing from the teachings hereof. For example, a variation on FIG. 10 can be implemented with a PMOS transistor (or circuitry including a PMOS transistor) replacing NMOS transistor N2 and resistor $R_1$ of FIG. 10. All such modifications are intended to be encompassed within the following claims.

What is claimed is:

1. A DC-to-DC converter for producing a regulated output potential in response to an input potential, wherein the DC-to-DC converter operates in a soft start mode during a soft start period and in a steady state mode after the soft start period, said DC-to-DC converter comprising:

a switching controller implemented as an integrated circuit, wherein the controller includes circuitry configured to periodically switch on a power switch during both the soft start mode and the steady state mode and switch off the power switch during the steady state mode at times determined by a reset signal, wherein the controller includes circuitry configured to generate the reset signal during both the soft start mode and the steady state mode in response to a first feedback potential; and external circuitry coupled to the controller, wherein the external circuitry includes circuitry configured to generate a second feedback potential and assert the second feedback potential to the controller, wherein the second feedback potential is proportional to the output potential and is regulated by at least one of the controller and the external circuitry so as not to significantly exceed a target value, and wherein one of the controller and the external circuitry includes the power switch, wherein the controller includes soft start circuitry coupled to receive the second feedback potential and the reset signal, wherein the soft start circuitry includes a soft start capacitor and is configured to generate a soft start reset signal during the soft start period in response to the second feedback potential, the reset signal, and a voltage across the soft start capacitor, wherein the controller is configured to switch off the power switch during the soft start mode at times determined by the soft start reset signal, whereby the controller controls operation of the DC-to-DC converter in the soft start mode without employing any component of the external circuitry other than components of the external circuitry that the controller employs to implement the steady state mode.

2. The convertor of claim 1, wherein the soft start circuitry includes:

charging circuitry coupled to the soft start capacitor and configured to charge the soft start capacitor during the soft start period;

an overvoltage comparator coupled and configured to compare the voltage across the soft start capacitor with the second feedback potential; and an OR gate having a first input coupled to receive the output of the comparator, a second input coupled to receive the reset signal, and an output at which the OR gate asserts the soft start reset signal.

3. The convertor of claim 2, wherein the soft start circuitry also includes:

logic circuitry, coupled to the output of the comparator and configured to generate a control signal which prevents the power switch from switching on when the feedback potential rises above the voltage across the soft start capacitor.

4. The convertor of claim 3, wherein the switching controller includes an oscillator having an oscillator output, wherein the oscillator is configured to assert a pulse train at the oscillator output, and wherein the logic circuitry includes:

an inverter, having an input coupled to the output of the comparator, and having an inverter output; and an AND gate, having a first input coupled to the oscillator output, a second input coupled to the inverter output, and an AND gate output, wherein the AND gate passes the pulse train from the oscillator output to the AND gate output only when the feedback potential is less than the voltage across the soft start capacitor, thereby preventing the power switch from switching on when the feedback potential exceeds the voltage across the soft start capacitor.

5. The converter of claim 1, wherein the charging circuitry is configured to charge the soft start capacitor intermittently.

6. The converter of claim 5, wherein the charging circuitry is configured to charge the soft start capacitor intermittently, with a duty cycle selected to allow the soft start capacitor to have capacitance below a desired value, and yet be gradually chargeable up to a voltage not less than the target value over the entire duration of the soft start period.

7. The converter of claim 5, wherein the charging circuitry includes:
a switch having a first state which allows charging of the soft start capacitor and a second state which prevents charging of the soft start capacitor; and
a one shot circuit coupled to the switch and configured to assert a pulse train to the switch, wherein the pulse train consists of pulses that occur with period T, and the pulse train causes the switch to enter the first state at times coinciding with the switching on of the power transistor and to enter the second state at a time P after each time that the switch enters the first state, where P is substantially less than T.

8. The converter of claim 7, wherein the switch is an NMOS transistor having a gate, a drain, and a source, and the charging circuitry includes:
a resistor coupled to the drain of the NMOS transistor, wherein the source of the NMOS transistor is coupled to the soft start capacitor and the gate of the NMOS transistor is coupled to the one shot circuit such that said pulse train is asserted to said gate.

9. The converter of claim 7, wherein the switch is an NMOS transistor having a gate, a drain, and a source, and the charging circuitry includes:
a current source coupled to the drain of the NMOS transistor, wherein the source of the NMOS transistor is coupled to the soft start capacitor and the gate of the NMOS transistor is coupled to the one shot circuit such that said pulse train is asserted to said gate.

10. The converter of claim 1, wherein the switching controller is a current mode switching controller.

11. The converter of claim 10, wherein the external circuitry includes circuitry configured to generate the first feedback potential and assert said first feedback potential to the controller.

12. A DC-to-DC converter for producing a regulated output potential in response to an input potential, wherein the DC-to-DC converter operates in a soft start mode during a soft start period and in a steady state mode after the soft start period, said DC-to-DC converter comprising:
a switching controller implemented as an integrated circuit, wherein the controller includes circuitry is configured to periodically switch on a power switch during both the soft start mode and the steady state mode and switch off the power switch during the steady state mode at times determined by a reset signal, wherein the controller includes circuitry configured to generate the reset signal during both the soft start mode and the steady state mode in response to a first feedback potential; and
external circuitry coupled to the controller, wherein the external circuitry includes circuitry configured to generate a second feedback potential and assert the second feedback potential to the controller, wherein the second feedback potential is proportional to the output potential and is regulated by at least one of the controller and the external circuitry so as not to significantly exceed a target value, and wherein one of the controller and the external circuitry includes the power switch,
wherein the controller includes internal soft start circuitry coupled to receive the second feedback potential and the reset signal, said soft start circuitry including:
a soft start capacitor;
charging circuitry coupled to the soft start capacitor and configured to charge the soft start capacitor during the soft start period;
an overvoltage comparator coupled and configured to compare the voltage across the soft start capacitor with the second feedback potential; and
an OR gate having a first input coupled to receive the output of the comparator, a second input coupled to receive the reset signal, and an output at which the OR gate asserts a soft start reset signal during the soft start period, wherein the controller is configured to switch off the power switch during the soft start mode at times determined by the soft start reset signal.

13. The convertor of claim 12, wherein the charging circuitry is configured to charge the soft start capacitor intermittently.

14. The convertor of claim 13, wherein the soft start circuitry also includes:
logic circuitry, coupled to the output of the comparator and configured to generate a control signal which prevents the power switch from switching on when the feedback potential rises above the voltage across the soft start capacitor.

15. The converter of claim 13, wherein the charging circuitry includes:
a switch having a first state which allows charging of the soft start capacitor and a second state which prevents charging of the soft start capacitor; and
a one shot circuit coupled to the switch and configured to assert a pulse train to the switch, wherein the pulse train consists of pulses that occur with period T, and the pulse train causes the switch to enter the first state at times coinciding with the switching on of the power transistor and to enter the second state at a time P after each time that the switch enters the first state, where P is substantially less than T.

16. The converter of claim 15, wherein the switch is an NMOS transistor having a gate, a drain, and a source, and the charging circuitry includes:
a resistor coupled to the drain of the NMOS transistor, wherein the source of the NMOS transistor is coupled to the soft start capacitor and the gate of the NMOS transistor is coupled to the one shot circuit such that said pulse train is asserted to said gate.

17. The converter of claim 15, wherein the switch is an NMOS transistor having a gate, a drain, and a source, and the charging circuitry includes:
a current source coupled to the drain of the NMOS transistor, wherein the source of the NMOS transistor is coupled to the soft start capacitor and the gate of the NMOS transistor is coupled to the one shot circuit such that said pulse train is asserted to said gate.

18. The converter of claim 12, wherein the switching controller is a current mode switching controller.

19. The converter of claim 18, wherein the external circuitry includes circuitry configured to generate the first feedback potential and assert said first feedback potential to the controller.

20. The convertor of claim 12, wherein the soft start circuitry also includes:
logic circuitry, coupled to the output of the comparator and configured to generate a control signal which prevents the power switch from switching on when the feedback potential rises above the voltage across the soft start capacitor.

21. The convertor of claim 20, wherein the switching controller includes an oscillator having an oscillator output, wherein the oscillator is configured to assert a pulse train at the oscillator output, and wherein the logic circuitry includes:

an inverter, having an input coupled to the output of the comparator, and having an inverter output; and an AND gate, having a first input coupled to the oscillator output, a second input coupled to the inverter output, and an AND gate output, wherein the AND gate passes through the pulse train from the oscillator output to the AND gate output only when the feedback potential is less than the voltage across the soft start capacitor, thereby preventing the power switch from switching on when the feedback potential exceeds the voltage across the soft start capacitor.

22. A switching controller implemented as an integrated circuit, for use with external circuitry to implement a DC-to-DC converter capable of producing a regulated output potential in response to an input potential, and capable of operating in a soft start mode during a soft start period and in a steady state mode after the soft start period, wherein one of the controller and the external circuitry includes a power switch, and wherein the external circuitry includes circuitry configured to generate a second feedback potential for assertion to the controller, wherein the second feedback potential is proportional to the output potential and is regulated by at least one of the controller and the external circuitry so as not to significantly exceed a target value, said controller comprising:

circuitry configured to periodically switch on the power switch during both the soft start mode and the steady state mode and to switch off the power switch during the steady state mode at times determined by a reset signal;

circuitry configured to generate the reset signal during both the soft start mode and the steady state mode in response to a first feedback potential; and internal soft start circuitry coupled to receive the second feedback potential and the reset signal, said soft start circuitry including:

a soft start capacitor;

charging circuitry coupled to the soft start capacitor and configured to charge the soft start capacitor during the soft start period;

an overvoltage comparator coupled and configured to compare the voltage across the soft start capacitor with the second feedback potential; and an OR gate having a first input coupled to receive the output of the comparator, a second input coupled to receive the reset signal, and an output at which the OR gate asserts a soft start reset signal during the soft start period, wherein the controller is configured to switch off the power switch during the soft start mode at times determined by the soft start reset signal.

23. The controller of claim 22, wherein the charging circuitry is configured to charge the soft start capacitor intermittently.

24. The controller of claim 23, wherein the soft start circuitry also includes:

logic circuitry, coupled to the output of the comparator and configured to generate a control signal which prevents the power switch from switching on when the feedback potential rises above the voltage across the soft start capacitor.

25. The controller of claim 24, wherein the circuitry configured to periodically switch on the power switch includes an oscillator having an oscillator output, wherein the oscillator is configured to assert a pulse train at the oscillator output, and wherein the logic circuitry includes:

an inverter, having an input coupled to the output of the comparator, and having an inverter output; and an AND gate, having a first input coupled to the oscillator output, a second input coupled to the inverter output, and an AND gate output, wherein the AND gate passes through the pulse train from the oscillator output to the AND gate output only when the feedback potential is less than the voltage across the soft start capacitor, thereby preventing the power switch from switching on when the feedback potential exceeds the voltage across the soft start capacitor.

26. The controller of claim 23, wherein the charging circuitry includes:

a switch having a first state which allows charging of the soft start capacitor and a second state which prevents charging of the soft start capacitor; and a one shot circuit coupled to the switch and configured to assert a pulse train to the switch, wherein the pulse train consists of pulses that occur with period T, and the pulse train causes the switch to enter the first state at times coinciding with the switching on of the power transistor and to enter the second state at a time P after each time that the switch enters the first state, where P is substantially less than T.

27. The controller of claim 26, wherein the switch is an NMOS transistor having a gate, a drain, and a source, and the charging circuitry includes:

a resistor coupled to the drain of the NMOS transistor, wherein the source of the NMOS transistor is coupled to the soft start capacitor and the gate of the NMOS transistor is coupled to the one shot circuit such that said pulse train is asserted to said gate.

28. The controller of claim 26, wherein the switch is an NMOS transistor having a gate, a drain, and a source, and the charging circuitry includes:

a current source coupled to the drain of the NMOS transistor, wherein the source of the NMOS transistor is coupled to the soft start capacitor and the gate of the NMOS transistor is coupled to the one shot circuit such that said pulse train is asserted to said gate.

29. The controller of claim 22, wherein the switching controller is a current mode switching controller.

30. The controller of claim 22, wherein the soft start circuitry also includes:

logic circuitry, coupled to the output of the comparator and configured to generate a control signal which prevents the power switch from switching on when the feedback potential rises above the voltage across the soft start capacitor.

31. A switching controller implemented as an integrated circuit, for use with external circuitry to implement a DC-to-DC converter capable of producing a regulated output potential in response to an input potential, and capable of operating in a soft start mode during a soft start period and in a steady state mode after the soft start period, wherein one of the controller and the external circuitry includes a power switch, and wherein the external circuitry includes circuitry configured to generate a first feedback potential and a second feedback potential for assertion to the controller, wherein the second feedback potential is proportional to the output potential and is regulated by at least one of the controller and the external circuitry so as not to significantly exceed a target value, said controller comprising:

circuitry configured to periodically switch on the power switch during both the soft start mode and the steady state mode and to switch off the power switch during the steady state mode at times determined by a reset signal;

circuitry configured to generate the reset signal during both the soft start mode and the steady state mode in response to the first feedback potential; and internal soft start circuitry coupled to receive the second feedback potential and the reset signal, said soft start circuitry including a soft start capacitor and charging circuitry coupled to the soft start capacitor and configured to charge the soft start capacitor during the soft start period, wherein said soft start circuitry is configured to generate a soft start reset signal during the soft start period in response to the second feedback potential, the reset signal, and a voltage across the soft start capacitor, wherein the controller is configured to switch off the power switch during the soft start mode at times determined by the soft start reset signal, whereby the controller controls operation of the DC-to-DC converter in the soft start mode without employing any component of the external circuitry other than components of the external circuitry that the controller employs to implement the steady state mode.

32. The controller of claim 31, wherein the soft start circuitry includes:

an overvoltage comparator coupled and configured to compare the voltage across the soft start capacitor with the second feedback potential; and an OR gate having a first input coupled to receive the output of the comparator, a second input coupled to receive the reset signal, and an output at which the OR gate asserts the soft start reset signal.

33. The controller of claim 32, wherein the soft start circuitry also includes:

logic circuitry, coupled to the output of the comparator and configured to generate a control signal which prevents the power switch from switching on when the feedback potential rises above the voltage across the soft start capacitor.

34. The controller of claim 31, wherein the charging circuitry is configured to charge the soft start capacitor intermittently.

35. The controller of claim 34, wherein the soft start circuitry includes:

an overvoltage comparator coupled and configured to compare the voltage across the soft start capacitor with the second feedback potential; and an OR gate having a first input coupled to receive the output of the comparator, a second input coupled to receive the reset signal, and an output at which the OR gate asserts the soft start reset signal.

36. The controller of claim 31, wherein the switching controller is a current mode switching controller.

37. A DC-to-DC converter for producing a regulated output potential in response to an input potential, wherein the DC-to-DC converter operates in a soft start mode during a soft start period and in a steady state mode after the soft start period, said DC-to-DC converter comprising:

a switching controller implemented as an integrated circuit, wherein the controller includes circuitry configured to periodically switch on a power switch during both the soft start mode and the steady state mode and switch off the power switch during the steady state mode at times determined by a reset signal, wherein the controller includes circuitry configured to generate the reset signal during both the soft start mode and the steady state mode in response to a first feedback potential; and external circuitry coupled to the controller, wherein the external circuitry includes circuitry configured to generate a second feedback potential and assert the second feedback potential to the controller, wherein the second feedback potential is proportional to the output potential and is regulated by at least one of the controller and the external circuitry so as not to significantly exceed a target value, and wherein one of the controller and the external circuitry includes the power switch, wherein the circuitry configured to generate the reset signal includes an error amplifier configured to generate a control signal, for use in generating said reset signal, in response to relative values of the second feedback potential and an effective reference potential, said error amplifier having a first input and a second input; and wherein the controller includes soft start circuitry coupled to receive the second feedback potential and a reference potential, wherein the reference potential remains at least substantially fixed during the soft start period and the steady state mode, and wherein the soft start circuitry includes a soft start capacitor, charging circuitry coupled to the capacitor and configured to charge the capacitor during the soft start period, first circuitry coupled to the first input of the error amplifier and configured to assert a reference signal indicative of the effective reference potential to said first input, and second circuitry coupled to the second input of the error amplifier and configured to assert a signal indicative of the second feedback potential to said second input, wherein the first circuitry has a first node coupled to the capacitor and a second node coupled to receive the reference potential, and the first circuitry is configured to generate the reference signal such that the effective reference potential is a linear combination of the reference potential and the voltage across the capacitor during the soft start period so that the effective reference potential increases when the voltage across the capacitor increases during the soft start period, and the first circuitry is configured to generate the reference signal such that the effective reference potential is at least substantially equal to the reference potential and is independent of the voltage across the capacitor during the steady state mode, whereby the reference signal remains at least substantially fixed during the steady state mode.

38. The converter of claim 37, wherein the first circuitry comprises:

a MOSFET device having a gate coupled to the capacitor, and a channel, wherein the gate of said MOSFET device is the first node;

a second MOSFET device having a gate coupled to receive the reference potential, and a channel, wherein the gate of the second MOSFET device is the second node;

a first current source coupled to a third node, wherein the third node is coupled to the channel of the MOSFET device, to the channel of the second MOSFET device, and to the first input of the error amplifier;

and wherein the second circuitry comprises:
- a third MOSFET device having a gate coupled to receive the second feedback potential, and a channel; and
- a second current source coupled to a fourth node, wherein the fourth node is coupled to the channel of the third MOSFET device and to the second input of the error amplifier.

39. A switching controller implemented as an integrated circuit, for use with external circuitry to implement a DC-to-DC converter capable of producing a regulated output potential in response to an input potential, and capable of operating in a soft start mode during a soft start period and in a steady state mode after the soft start period, wherein one of the controller and the external circuitry includes a power switch, and wherein the external circuitry includes circuitry configured to generate a first feedback potential and a second feedback potential for assertion to the controller, wherein the second feedback potential is proportional to the output potential and is regulated by at least one of the controller and the external circuitry so as not to significantly exceed a target value, said controller comprising:
- circuitry configured to periodically switch on the power switch during both the soft start mode and the steady state mode and to switch off the power switch during the steady state mode at times determined by a reset signal;
- reset circuitry configured to generate the reset signal during both the soft start mode and the steady state mode in response to the first feedback potential, wherein the reset circuitry includes an error amplifier configured to generate a control signal for use in generating said reset signal, in response to relative values of the second feedback potential and an effective reference potential, said error amplifier having a first input and a second input; and
- soft start circuitry coupled to receive the second feedback potential and a reference potential, wherein the reference potential remains at least substantially fixed during the soft start period and the steady state mode, said soft start circuitry including:
  - a soft start capacitor;
  - charging circuitry coupled to the capacitor and configured to charge the capacitor during the soft start period;
  - first circuitry coupled to the first input of the error amplifier and configured to assert a reference signal indicative of the effective reference potential to said first input; and
  - second circuitry coupled to the second input of the error amplifier and configured to assert a signal indicative of the second feedback potential to said second input, wherein the first circuitry has a first node coupled to the capacitor and a second node coupled to receive the reference potential, and the first circuitry is configured to generate the reference signal such that the effective reference potential is a linear combination of the reference potential and the voltage across the capacitor during the soft start period so that the effective reference potential increases when the voltage across the capacitor increases during the soft start period, and the first circuitry is configured to generate the reference signal such that the effective reference potential is at least substantially equal to the reference potential and is independent of the voltage across the capacitor during the steady state mode, whereby the reference signal remains at least substantially fixed during the steady state mode.

40. The switching controller of claim 39, wherein the first circuitry comprises:
- a MOSFET device having a gate coupled to the capacitor, and a channel, wherein the gate of said MOSFET device is the first node;
- a second MOSFET device having a gate coupled to receive the reference potential, and a channel, wherein the gate of the second MOSFET device is the second node;
- a first current source coupled to a third node, wherein the third node is coupled to the channel of the MOSFET device, to the channel of the second MOSFET device, and to the first input of the error amplifier;

and wherein the second circuitry comprises:
- a third MOSFET device having a gate coupled to receive the second feedback potential, and a channel; and
- a second current source coupled to a fourth node, wherein the fourth node is coupled to the channel of the third MOSFET device and to the second input of the error amplifier.

41. The switching controller of claim 40, wherein the first MOSFET device is a first PMOS transistor having a source coupled to the third node and a grounded drain, the second MOSFET device is a second PMOS transistor having a source coupled to the third node, and the third MOSFET device is a third PMOS transistor having a source coupled to the fourth node.

42. A method for performing DC-to-DC conversion using a switching controller chip and external circuitry coupled to the controller chip to cause the external circuitry to generate an output potential which increases to a regulated value during a soft start period, having a start and a duration, and remains at the regulated value during steady state operation, wherein the controller chip periodically switches on a power switch, generates a reset signal in response to a first feedback signal during the soft start period and during the steady state operation and switches off the power switch in response to the reset signal during said steady state operation, wherein the external circuitry develops a second feedback potential which is proportional to the output potential and is regulated so as not to significantly exceed a target value, and the controller chip includes a soft start capacitor, said method including the steps of:
- (a) operating circuitry internal to the controller chip to commence charging of the soft start capacitor at the start of the soft start period, and to continue charging the soft start capacitor during the soft start period;
- (b) while performing step (a), comparing the voltage across the soft start capacitor with the second feedback potential to generate a first signal indicative of relative level of said voltage across the soft start capacitor and the second feedback potential; and
- (c) asserting the first signal and the reset signal to an OR gate internal to the controller chip thereby causing the OR gate to produce a control signal, and switching off the power switch in response to the control signal during the soft start period.

43. The method of claim 42, wherein step (a) includes the step of charging the soft start capacitor intermittently, thereby gradually increasing the voltage across the soft start capacitor to a value not less than the target value over the duration of the soft start period.

44. The method of claim 42, wherein the power switch is switched on periodically with period T, and wherein step (a) includes the step of charging the soft start capacitor periodically and intermittently, with each period of charging of the soft start capacitor commencing at a time coinciding with switching on of the power switch and continuing for a duration P, where the duration P is substantially less than the period T.

* * * * *